United States Patent
Gibbons et al.

[11] Patent Number: 5,817,743
[45] Date of Patent: Oct. 6, 1998

[54] PROCESS AND MATERIALS FOR INDUCING PRE-TILT IN LIQUID CRYSTALS AND LIQUID CRYSTAL DISPLAYS

[75] Inventors: Wayne M. Gibbons, Bear, Del.; Paul J. Shannon, Exton, Pa.; Shao-Tang Sun, Newark, Del.

[73] Assignee: Alliant Techsystems Inc., Hopkins, Minn.

[21] Appl. No.: 645,824

[22] Filed: May 14, 1996

Related U.S. Application Data

[63] Continuation-in-part of Ser. No. 624,942, Mar. 29, 1996.

[51] Int. Cl.⁶ .............................. C08G 73/10; G02F 1/13
[52] U.S. Cl. ........................... 528/353; 428/1; 428/473.5; 350/341; 350/345; 350/346; 350/349; 350/350 R; 350/350 S; 350/351; 359/44; 359/90
[58] Field of Search .................................. 528/353; 428/1, 428/473.5; 350/341, 349, 350 S, 351, 346, 345, 350 R; 359/44.9

[56] References Cited

U.S. PATENT DOCUMENTS

| | | | |
|---|---|---|---|
| 4,974,941 | 12/1990 | Gibbons et al. | 350/349 |
| 5,032,009 | 7/1991 | Gibbons et al. | 350/341 |
| 5,073,294 | 12/1991 | Shannon et al. | 252/299.01 |
| 5,237,440 | 8/1993 | Watanabe et al. | 359/90 |
| 5,382,548 | 1/1995 | Lee | 437/233 |

FOREIGN PATENT DOCUMENTS 0539992  5/1993  European Pat. Off. .

OTHER PUBLICATIONS

Ishibrashi, et al. (Mol. Cryst. Liq. Cryst., 1993, 225, 99–105.
Nishikawa, et al., (Jpn. J. Appl. Phys., 1994, 33, L810–L812).
Fukuro, et al., (Mol. Cryst. Liq. Cryst. 1988, 163, 157–162.
Dyadyisha et al. (Mol. Cryst Liq. Cryst. (1995, 263, 399–413).

Primary Examiner—Patricia Hampton-Hightower
Attorney, Agent, or Firm—Huntley & Associates

[57] ABSTRACT

A process for inducing pre-tilt in alignment of a liquid crystal medium comprising exposing at least one optical alignment layer, comprising anisotropically absorbing molecules and hydrophobic moieties, to polarized light; the polarized light having a wavelength within the absorption band of said anisotropically absorbing molecules; wherein the exposed anisotropically absorbing molecules induce alignment of the liquid crystal medium at an angle $+$ and $-\theta$ with respect to the direction of the polarization of the incident light beam and along the surface of the optical alignment layer, and induce a pre-tilt at an angle $\Phi$ with respect to the surface of the optical alignment layer and applying a liquid crystal medium to said optical alignment layer, is described. The invention also is directed to liquid crystal display elements made by the process of the invention and to novel polyimide compositions that are useful as optical alignment layers in the invention.

48 Claims, 3 Drawing Sheets

PROCESS AND MATERIALS FOR INDUCING PRE-TILT IN LIQUID CRYSTALS AND LIQUID CRYSTAL DISPLAYS

CROSS-REFERENCE TO RELATED APPLICATION

This Application is a Continuation-in-Part of application U.S. Ser. No. 08/624,942, filed on Mar. 29, 1996.

This invention was made with United States Government support under cooperative agreement No. 70NANB4H1525 awarded by the United States Department of Commerce. The United States Government has certain rights in the invention.

BACKGROUND OF INVENTION

The present invention relates to processes for inducing pre-tilt in alignment of a liquid crystal medium, compositions useful in these processes, and liquid crystal display elements.

Liquid crystal compounds are used in human and machine readable displays, finding applications in instrument controls, such as those in motor vehicles, avionics, medical devices, process control devices and watches. Display devices are primarily comprised of liquid crystal cells having a glass or other substrate coated with a transparent conductive material in front and behind a liquid crystal medium. Light transmission through these devices is controlled through orientation of the liquid crystal compounds or dyes dissolved therein. In this way, a voltage or, in some instances, a magnetic field may be applied to the cell so that the liquid crystals are oriented in a fashion such that all, some or none of the light is passed through. In addition, depending on the device geometry, polarizers may be used in conjunction with the liquid crystal medium to control light transmission.

Aligned liquid crystal cells in commerical use are typically oriented in directions suitable for controlling light transmission. That is, the molecules in the liquid crystal composition are aligned so as to assume a homogeneous or homeotropic alignment. Without external stimuli the display will either appear opaque or transparent. By applying an electric field the molecules are rotated along a fixed axis so as to alter the transmission properties in a desired fashion.

Current liquid crystal display elements include a product that utilizes a twisted nematic mode, i.e. having a structure wherein the aligning direction of nematic liquid crystal molecules is twisted by 90° between a pair of upper and lower electrode substrates, a product utilizing a supertwisted nematic mode, utilizing a birefringent effect, i.e. having a structure wherein the aligning direction of nematic liquid crystal molecules is twisted by 180° to 300°, and a product utilizing a ferroelectric liquid crystal substance or an anti-ferroelectric liquid crystal substance. Common to each of these products is a liquid crystal layer disposed between a pair of substrates coated with a polymeric alignment layer. The polymeric alignment layer controls the direction of alignment of the liquid crystal medium in the absence of an electric field. Usually the direction of alignment of the liquid crystal medium is established in a mechanical buffing process wherein the polymer layer is buffed with a cloth or other fiberous material. The liquid crystal medium contacting the buffed surface typically aligns parallel to the mechanical buffing direction. Alternatively, an alignment layer comprising anisotropically absorbing molecules can be exposed to polarized light to align a liquid crystal medium as disclosed in U.S. Pat. Nos. 5,032,009 and 4,974,941, both entitled "Process of Aligning and Realigning Liquid Crystal Media," which are hereby incorporated by reference.

The process for aligning liquid crystal media with polarized light is a noncontact method of alignment which can reduce dust and static charge buildup on alignment layers. Other advantages of the optical alignment process include high resolution control of alignment direction and high quality of alignment.

Requirements of optical alignment layers for liquid crystal displays include low energy threshold for alignment, transparency to visible light (no color), good dielectric properties and voltage holding ratios, long-term thermal and optical stability and in many applications a controlled uniform pre-tilt angle. Most liquid crystal devices, including displays, have a finite pre-tilt angle, controlled, for instance, by the mechanical buffing of selected polymeric alignment layers. The liquid crystal molecules in contact with such a layer aligns parallel to the buffing direction, but is not exactly parallel to the substrate. The liquid crystal molecules are slightly tilted from the substrate, for instance by about 2–15 degrees. For optimum performance in most display applications a finite and uniform pre-tilt angle of the liquid crystal is desirable.

The process for aligning liquid crystal media with polarized light has many attractive features. However, up to now, controlling the pre-tilt angle of liquid crystals in contact with optical alignment layers, while maintaining the uniformity of alignment, has been lacking. Furthermore to meet the above stated requirements of transparency the use of anisotropically absorbing molecules that absorb in the visible region are generally not acceptable.

SUMMARY OF INVENTION

The instant invention provides a process of inducing pre-tilt in alignment of a liquid crystal medium that is useful in aligning liquid crystal displays and other liquid crystal devices; and new materials for optical alignment layers that provide excellent alignment properties upon exposure to UV light.

Specifically, the present invention provides process for inducing pre-tilt in alignment of a liquid crystal medium adjacent to a surface of an optical alignment layer comprising:

(a) exposing at least one optical alignment layers, comprising anisotropically absorbing molecules and hydrophobic moieties, to polarized light, the polarized light having a wavelength within the absorption band of said anisotropically absorbing molecules; wherein the exposed anisotropically absorbing molecules induce alignment of the liquid crystal medium at an angle + and $-\theta$ with respect to the direction of the polarization of the incident light beam and along the surface of the optical alignment layer and induce a pre-tilt at an angle $\Phi$ with respect to the surface of the optical alignment layer;

(b) applying the liquid crystal medium to the optical alignment layer, the medium having an isotropic point; and thereafter (c) heating the liquid crystal medium above its isotropic point; and (d) cooling the liquid crystal medium below its isotropic point.

The invention further pertains to a liquid crystal display element derived from the process of the invention.

The invention utilizes polyimide compositions for generating pre-tilt in alignment of a liquid crystal medium comprising a copolyimide derived from at least one diaryl ketone tetracarboxylic dianhydride, at least one hydrophobic diamine and at least one alicyclic tetracarboxylic anhydride, which comprises at least two structural elements of the formulas IV and V

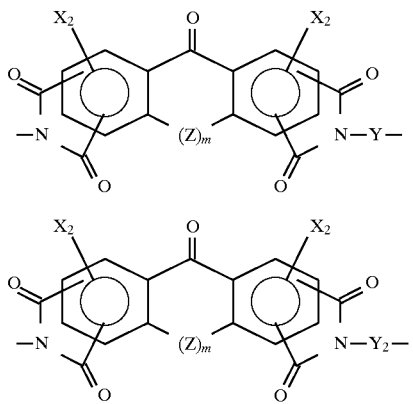

wherein Y is a divalent radical selected from the formulas II and III

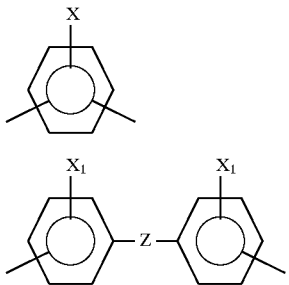

wherein Z is independently selected from the group consisting of —S—, —O—, —SO$_2$—, —CH$_2$—, —C(CF$_3$)$_2$—, —C(O)—, —CH$_2$CH$_2$—, —NR— and a covalent bond wherein R is a C$_1$–C$_4$ hydrocarbon chain; X is independently selected from R$_1$, —O—R$_1$, —S—R$_1$, —N(R$_2$)—R$_1$; wherein R$_1$ is independently selected from C$_4$–C$_{20}$ perfluorinated alkyl chain, C$_4$–C$_{20}$ partially fluorinated alkyl chain, and C$_{10}$–C$_{20}$ hydrocarbon chain; X$_1$ is independently selected from X and H; R$_2$ is selected, independently, from H, C$_1$–C$_9$ hydrocarbon chain and R$_1$; X$_2$ is independently selected from the group consisting of H, CL, F, Br, R$_3$ and R$_3$O—, wherein R$_3$ is independently selected from the group consisting of C$_1$–C$_3$ perflourinated alkyl chain, C$_1$–C$_3$ partially flourinated alkyl chain and C$_1$–C$_8$ hydrocarbon chain; m is 1 or 0; and P is a tetravalent organic radical derived from the alicyclic tetracarboxylic dianhydride containing at least four carbon atoms, no more than one carbonyl group of the dianhydride being attached to any one carbon atom of the tetravalent radical.

DETAILED DESCRIPTION

Figure 1:
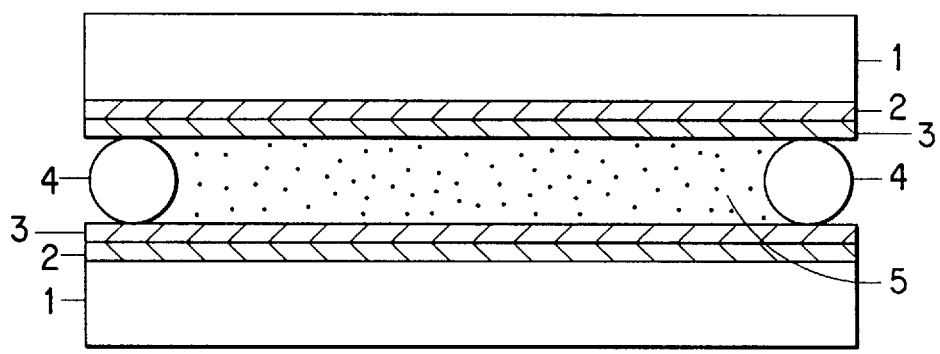
FIG. 1 is a cross-sectional view of a general liquid crystal display cell of the present invention.

As used herein "substrate" means the supporting structure for an alignment layer. A substrate can be any solid combination of layered materials that provide a useful function for the final optical alignment layer or liquid crystal display. For example, the substrate can be any combination of the following materials: crystalline or amorphous silicon, glass, plastic, including polyester, polyethylene and polyimide; quartz, indium-tin-oxide, gold, silver, silicon dioxide, polyimide, silicon monoxide, anti-reflective coatings, color filter layers, polarizers and phase compensating films. In practice, some of these materials are deposited or coated onto a basic supporting structure such as glass or plastic.

As used herein, the term "alignment layer" means the layer of material on the surface of a substrate that controls the alignment of a liquid crystal layer in the absence of an external field. A "conventional alignment layer" herein refers to an alignment layer that will only align a liquid crystal layer via processing other than optical means. For example, mechanically buffed polyimides, evaporated silicon dioxide, Langmuir-Blodgett films, have all been shown to align liquid crystals.

As used herein, the term "alignment of liquid crystals" means that the long molecular axes of the liquid crystal molecules have a preferred local alignment direction, or director. The director is the average direction of an ensemble of liquid crystal molecules which can be quantified by order parameter or other measurements well known in the art. Orientational order parameters are routinely described by the equation:

$$S = \tfrac{1}{2} \langle 3 \cos^2 \alpha - 1 \rangle$$

where α is the angle between the director and the long axis of each molecule, the molecules being regarded as cylindrically symmetric. The brackets denote an average over the ensemble of molecules. Order parameters range from 0 to 1.0. A 0 value indicates no long range alignment of the liquid crystals is present. A value of 1.0 indicates the liquid crystal molecules are fully aligned along a director. Preferred order parameters resulting from the process of the instant invention are in the range of about from 0.1 to 1.0.

"Optical alignment layer" herein refers to an alignment layer that contains anisotropically absorbing molecules that will align liquid crystals after exposure with polarized light. Optical alignment layers may be processed by conventional means, such as mechanical rubbing, prior to or after exposure to polarized light. The anisotropically absorbing molecules of the optical alignment layers exhibit absorption properties with different values when measured along axes in different directions. The anisotropically absorbing molecules exhibit absorption of about from 150 nm to 2000 nm. The anisotropically absorbing molecules of the optical alignment layer can be covalently bonded within a main chain polymer, they can be covalently bonded as side groups to a main polymer chain, they can be present as nonbonded solutes in a polymer, or they can be in the adjacent liquid crystal layer as a solute and adsorbed on the surface of a normal alignment layer to give an optical alignment layer.

Preferred optical alignment layers have absorbance maxima of about from 150 to 1600 nm. More preferable optical alignment layers have absorbance maxima of about from 150 nm to 800 nm. Most preferable optical alignment layers for the present invention have absorbance maxima between 150 and 400 nm and especially between 300 and 400 nm.

Anisotropically absorbing molecules useful in preparation of optical alignment layers are the dichroic arylazo, di(arylazo), tri(arylazo), tetra(arylazo), penta(arylazo), anthraquinone, mericyanine, methine, 2-phenylazothiazole, 2-phenylazobenzthiazole, stilbene, 1,4-bis(2-phenylethenyl)

benzene, 4,4'-bis(arylazo)stilbenes, perylene and 4,8-diamino-1,5-napthoquinone dyes. Other useful anisotropically absorbing materials are the liquid crystal coupled dichroic dyes described in U.S. Pat. No. 5,389,285.

Preparation of the anisotropically absorbing materials listed above are well known as shown, e.g., by Huffman et al, in U.S. Pat. No. 4,565,424, Jones et al, in U.S. Pat. No. 4,401,369, Cole, Jr. et al. in U.S. Pat. No. 4,122,027, Etzbach et al, in U.S. Pat. No. 4,667,020, and Shannon et al, in U.S. Pat. No. 5,389,285.

Other anisotropically absorbing molecules useful in the preparation of colorless optical alignment layers are diaryl ketones having a ketone moiety or ketone derivative in conjugation with two aromatic rings. Specific families of these molecules useful in optical alignment layers are substituted benzophenones, benzophenone imines, phenylhydrazones, and semicarbazones. Specific benzophenone derivatives preferred in optical alignment layers for the process of this invention are benzophenone, 4,4'-diaminobenzophenone, 4,4'-bis(trifluoromethyl) benzophenone, 3,4'-bis(trifluoromethyl)benzophenone, and 3,3'-bis(trifluoromethyl)benzophenone. The benzophenone and 4,4'-trifluoromethylbenzophenone imines derived from n-octadecylamine, 4-hexyloxyaniline and 4-octadecyloxyaniline are also preferred. The phenylhydrazones of benzophenone, 4,4'-bis(trifluoromethyl) benzophenone, 3,4'-bis(trifluoromethyl)benzophenone, 3,3'-bis(trifluoromethyl)benzophenone, derived from condensation with phenylhydrazine; and the 2,4-diaminophenylhydrazones of benzophenone, 4,4'-bis (trifluoromethyl)benzophenone, 3,4'-bis(trifluoromethyl) benzophenone, and 3,3'-bis(trifluoromethyl)benzophenone, derived from the chemical reduction of the corresponding 2,4-dinitrophenylhydrazones are also preferred in optical alignment layers for the present invention.

Preferred anisotropically absorbing molecules for optical alignment layers are arylazo, poly(arylazo), stilbene and diaryl ketone derivatives. Arylazo, stilbene and diaryl ketone derivatives are the most preferred dyes for optical alignment layers having absorbance maxima of about from 150 to 400 nm. Poly(arylazo) dyes are most preferred for optical alignment layers having absorbance maxima of about from 400 to 800 nm. A most preferred poly(azo) dye is diazodiamine A; a most preferred stilbene dye is 4,4'-diaminostilbene, B; a most preferred arylazo dye is monoazodiamine C (Table 1). The preparation of the dye A is described in U.S. Pat. No. 5,389,285; synthesis of dye C is described in the examples; and 4,4'-diaminostilbene is commercially available from Aldrich Chemical Co., Milwaukee, Wis., as the dihydrochloride salt.

Diaryl ketone tetracarboxylic dianhydrides are especially useful and preferred as anisotropically absorbing molecules. Preferred diaryl ketone tetracarboxylic dianhydrides are further described in greater detail infra in the discussion of polyimides.

Optical alignment layers used in the process of this invention also comprise hydrophobic moieties. "Hydrophobic moieties" refer to functional groups that impart strong water imicibility and high surface tension properties to materials. The hydrophobic moieties are usually, but not exclusively, covalently bonded to a polymer that also acts as a matrix or carrier for the anisotropically absorbing molecules that make up the optical alignment layer. Most notable hydrophobic moieties are fluorinated and partially fluorinated alkyl chains and long chain aliphatic hydrocarbons. Common hydrophobic moieties containing fluorinated and partially fluorinated alkyl chains, for instance, are monovalent 1H,1H-pentadecafluoro-1-octyloxy and 11H-eicosafluoroundecanoyl groups, which are readily available from commercial materials or well known syntheses. Common hydrophobes containing long aliphatic hydrocarbon chains are the monovalent hexadecyl, hexadecyloxy, octadecyl, and octadecyloxy groups and the divalent hexadecylmethylene and octadecylmethylene groups.

Methods for incorporating hydrophobic moieties into many polymer materials are well known. Examples of polymers having hydrophobic moieties that are useful as matrices for optical alignment layers are poly(methyl methacrylate) and poly(methyl acrylate) copolymers containing various loadings of fluoroalkyl methacrylates and fluoroalkyl acryaltes such as 1H,1H,11H,-eicosafluoroundecyl methacrylate, for example.

Aromatic diamines substituted with hydrophobic moieties are especially useful and preferred as hydrophobic moieties in the synthesis of polyimides for optical alignment layers. Preferred hydrophobic diamines are further described infra in the discussion of polyimides.

Preferably, anisotropically absorbing molecules and hydrophobic moieties are covalently bonded to polymers. For instance, poly(amic acid)s, which are precursors to polyimides, can be prepared with anisotropic absorbing materials covalently bonded into the poly(amic acid) polymer chain. This typically is accomplished by mixing of dianhydride and diamines, including the anisotropically absorbing molecules as one of the two reactive components. For instance, 4,4'-diaminostilbene is an anisotropically absorbing molecule that also can act as a reactive diamine in polyimide synthesis. 3,3'4,4'-benzophenonetetracarboxylic anhydride is an anisotropically absorbing molecule that also can act as a reactive dianhydride in polyimide synthesis. Allowing the diamines and dianhydrides to polymerize in a solvent such as N-methylpyrolidone or tetrahydrofuran provides a prepolymer solution that is then coated on substrates and oven baked to give the final polyimide optical alignment layers.

Alternatively, optical alignment layers can have anisotropically absorbing molecules present as nonbonded solutes dissolved in a polymer containing hydrophobic moieties. These are referred to as guest-host optical alignment layers. They are prepared by coating on substrates a thin layer of organic material containing the anisotropically absorbing molecules. Typically the anisotropically absorbing molecules are dissolved in solution along with a polymeric material. The solution is then coated on substrates using, typically, a spin casting technique. The coatings are then oven baked to remove residual solvent and perform the final cure.

Alternatively, optical alignment layers are prepared by coating conventional alignment layers such as a hydrophobic polyimide on the substrates. The anisotropically absorbing molecules are dissolved in a liquid crystal medium to give a guest-host mixture. When the guest-host mixture containing anisotropically absorbing molecules is allowed to contact a conventional alignment layer an optical alignment layer is formed.

Alternatively, optical alignment layers are prepared by coating conventional alignment layers such as hydrophobic polyimide on the substrates and anisotropically absorbing molecules are dissolved in a solvent. When the solution containing anisotropically absorbing molecules is coated on the conventional alignment layer an optical alignment layer is formed.

Preferred polymers for optical alignment layers of this invention are polyimide polymers. The preparation of polyimides is described in "Polyimides", D. Wilson, H. D. Stenzenberger, and P. M. Hergenrother Eds., Chapman and Hall, New York (1990). Typically polyimides are prepared by the condensation of one equivalent of a diamine component with one equivalent of a dianhydride component in a polar solvent to give a poly(amic acid) prepolymer intermediate. Typical solvents used in the condensation reaction are N-methylpyrrolidone (NMP), dimethylacetamide (DMAc), dimethylformamide (DMF), dimethylsulfoxide (DMSO), butyl cellosolve, ethylcarbitol, γ-butyrolactone, etc. The poly(amic acid) is typically formulated to give a 1 to 30 wt % solution. The condensation reaction is usually performed between room temperature and 150° C. The prepolymer solution is coated onto a desired substrate and thermally cured at between 180° and 300° C. to complete the imidization process. Alternatively, the poly(amic acid) prepolymer is chemically imidized by addition of a dehydrating agent to form a polyimide polymer. Examples of chemical imidzation reagents arc organic anhydrides such as acetic anhydride and trifluoroacetic anhydride in combination with organic bases such as triethyl amine and pyridine. Other chemical imidization reagents are ethylchloroformate and triethylamine, thionyl chloride, oxalyl chloride, acetyl chloride and dicyclohexylcarbodiimide. Chemical imidizations are performed between room temperature and 150° C. Chemical imidization requires that the resulting polyimide be soluble in a solvent for further processing. Achieving solubility often requires polyimides to be specially formulated for chemical imidization. The chemically imidized polyimide solution is coated onto a substrate and heated to remove solvent, but no high temperature cure is required. Preferred compositions of this invention are chemically imidized polyimides.

Especially useful in the process of the invention is a polyimide polymer that is the condensation reaction product of hydrophobic diamines and dianhydrides. Preferred is a polyimide polymer that is a homopolymide or a copolyimide of at least one tetracarboxylic dianhydride and at least one hydrophobic diamine, which comprises at leas t one structural element of the formula I:

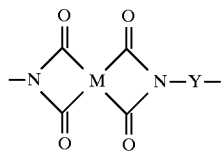

wherein Y is a divalent radical selected from the formula II and III

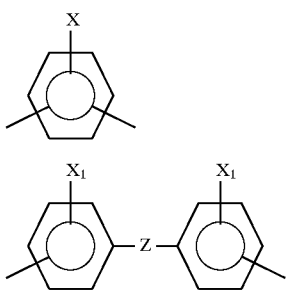

wherein Z is selected from the group consisting of —S—, —O—, —SO$_2$—, —CH$_2$—, —C(CF$_3$)$_2$—, —C(O)—, —CH$_2$CH$_2$—, —NR— and a covalent bond wherein R is a C$_1$–C$_4$ hydrocarbon chain; X is independently selected from R$_1$, —O—R$_1$, —S—R$_1$, —N(R$_2$)—R$_1$; wherein R$_1$ is independently selected from C$_4$–C$_{20}$ perfluorinated alkyl chain, C$_4$–C$_{20}$ partially fluorinated alkyl chain, and C$_{10}$–C$_{20}$ hydrocarbon chain; X$_1$ is independently selected from X and H; R$_2$ is independently selected from H, C$_1$–C$_9$ hydrocarbon chain and and R$_1$; and wherein M is a tetravalent organic radical derived from said tetracarboxylic dianhydride containing at least two carbon atoms, no more than two carbonyl groups of the dianhydride being attached to any one carbon atom of the tetravalent radical.

Diamines useful in this invention to induce a finite pre-tilt of a liquid crystal medium as well as provide good alignment uniformity are listed in Table 2. Preferred hydrophobic diamines have the structure

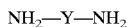

wherein Y is as described above. Specific hydrophobic diamines that are preferred in this invention are 4-(1H,1H-pentadecafluoro-1-octyloxy)-1,3-benzenediamine (8) and 4-(1H,1H,11H-eicosafluoro-1-undecyloxy)-1,3-benzenediamine (9). Specific diamines having hydrocarbon chains that are preferred are 4-(1-octadecyloxy)-1,3-benzenediamine (10), 4-(1-hexadecyl-1,3-benzenediamine and 2-(1-octadecyloxy)-1,4-benzenediamine (12).

Specific hydrophobic diamines useful in this invention are readily available by synthesis. The dinitro compounds corresponding to diamines 8 and 9 are prepared by nucleophilic displacement of halogen from 1-halo-2,4-dinitrobenzenes with 1H,1H-pentadecafluoro-1-octanol and 1H,1H,11H-eicosafluoro-1-undecanol, respectively, which are available from PCR Inbc. (Gainesville, Fla. 32602). They are chemically reduced to diamines to provide the diamines 8 and 9 as described by Ichino, et al, in J. Poly. Sci., 28, 323 (1990). Dinitro compounds corresponding to diamines 10–13 are prepared by alkylation of 2,4-dinitrophenol or 2,5 dinitrophenol with alkyl bromides in dimethylformamide/sodium carbonate at 90°–100° C. The dinitro compound corresponding to diamine 14 is prepared by nitration of n-octylbenzene. The dinitro compounds corresponding to diamines 15 and 16 are prepared from 1-chloro-2,4-dinitrobenzene as described in U.S. Pat. No. 4,973,429. The dinitro compounds are reduced to the corresponding diamines 10–16 chemically with tin (II) chloride/ethanol or catalytically with hydrogen and palladium/carbon.

Other diamines that can be used in combination with the hydrophobic diamines described above can very widely. Specific examples include the trifluoromethyl substituted diamines 1–7 and the lower hydrocarbon homologs 11, 13, and 14 of Table 2. Aromatic diamines which can be used include p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenylsulfone, diaminonaphthalene, 1,4-bis(4-aminophenoxy)benzene, 1,4-bis(4-aminophenyl)benzene, 9,10-bis(4-aminophenyl) anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl) hexafluoropropane and 2,2-bis[4-(4-aminophenoxy)phenyl] hexafluoropropane; alicyclic diamines such as bis(4-aminocyclohexyl)methane; and aliphatic diamines such as tetramethylenediamine and hexamethylene diamine. Further, diaminosiloxanes such as bis(3-aminopropyl) tetramethyldisiloxane can also be used. Such diamines may be used alone or in combination as a mixture of two or more.

Other diamines that are preferred in the process and polyimide compositions of the instant invention are diaminobenzophenones. Diaminobenzophenones are diaryl ketones and thus act as another source of photoactive species in the process. In copolyimides incorporating both diamino and dianhydride derivatives of diaryl ketones, a larger concentration of active chromophore can be achieved. Preferred diaminobenzophenones for copolyimide compositions of the instant invention is 4,4'-diaminobenzophenone and 3,4'-diaminobenzophenone.

Preferrably the hydrophobic diamines comprise about from 1.0 to 50 mol % of the diamine component, and most preferrably the hydrophobic diamines comprise about from 1.0 to 15 mol % of the diamine component. Loadings of the hydrophobic diamine greater than about 50 mol % of the diamine component tend to give pre-tilts greater 30 degrees.

In a preferred process of this invention the polyimide polymer is a copolyimide which additionally comprises at least one structural element of formula Ia

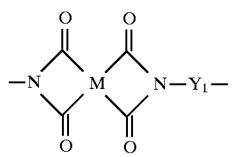

wherein $Y_1$ is a divalent organic radical having at least two carbon atoms other than Y; M is as described above; and wherein the ratio of structural elements of formula I and Ia are about from 1:99 to 99:1.

The tetracarboxylic dianhydrides useful in forming polyimides for the invention have the structural formula:

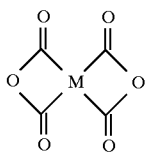

wherein M is a tetravalent organic radical containing at least two carbon atoms, no more than two carbonyl groups of the dianhydride being attached to any one carbon atom of the tetravalent radical.

Specific examples of the tetracarboxylic dianhydride component include aromatic dianhydrides such as pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 3,3'4,4'biphenyltetracarboxylic dianhydride, 2,3,2',3'-biphenyltetracarboxylic dianhydride, bis(3,4-dicarboxyphenyl)ether dianhydride, 3,3'4,4'-benzophenonetetracarboxylic dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride 1,1,3,3,3-hexafluoro-2,2-bis(3,4-dicarboxyphenyl)propane dianhydride, bis(3,4-dicarboxyphenyl)dimethylsilane dianhydride, 2,3,4,5-pyridinetetracarboxylic dianhydride; alicyclic tetracarboxylic dianhydrides such as 1,2,3,4-cyclobutanetetracarboxylic dianhydride, 1,2,3,4-butanetetracarboxylic dianhydride, 1,2,3,4-cyclopentanetetracarboxylic dianhydride, 1,2,4,5-cyclohexanetetracarboxylic dianhydride, 2,3,5-tricarboxycyclopentylacetic acid dianhydride and 3,4-dicarboxy-1,2,3,4-tetrahydro-1-naphthalenesuccinic dianhydride; and their acid and acid chloride derivatives.

Diaryl ketone tetracarboxylic dianhydrides especially useful for the invention are those having the following structure:

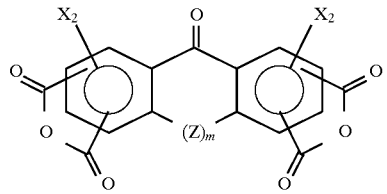

wherein $X_2$ is independently selected from the group consisting of H, CL, F, Br, $R_3$ and $R_3O$, wherein $R_3$ is independently selected from $C_1$–$C_3$ perflourinated alkyl chain, $C_1$–$C_3$ partially flourinated alkyl chain and $C_1$–$C_8$ hydrocarbon chain, m is 1 or 0; and Z is selected from the group consisting of —S—, —O—, —SO$_2$—, —CH$_2$—, —C(CF$_3$)$_2$—, —C(O), —CH$_2$CH$_2$—, —NR— and a covalent bond wherein R is a $C_1$–$C_4$ hydrocarbon chain. The more preferred diaryl ketones are 3,3',4,4'-benzophenonetetracarboxylic dianhydride (D1) and 2,2'-dichloro-4,4',5,5'-benzophenone tetracarboxylic dianhydride (D2). The most preferred benzophenone tetracarboxylic dianhydride for this invention is 3,3',4,4'-benzophenonetetracarboxylic dianhydride (D1). Other related photosensitive diaryl ketone dianhydrides described by Pfeifer, et al., in U.S. Pat. No. 4,698,295, herein incorporated by reference, are useful alternatives to the benzophenonetetracarboxylic dianhydrides in the process of this invention.

Specific benzophenonetetracarboxylic dianhydrides preferred in this invention are readily available from commercial sources or synthesis. For instance, 3,3',4,4'-benzophenonetetracarboxylic dianhydride (D1) is available from Aldrich Chemical Co., Inc. (1001 W. St. Paul Ave., Milwaukee, Wis. 53233). 2,2'-Dichloro-4,4',5,5'-benzophenone tetracarboxylic dianhydride (D2) is available from 4-chloro-o-xylene by Friedel-Crafts acylation with oxalyl chloride to give 2,2'dichloro-4,4',5,5',-tetramehtylbenzophenone, followed by oxidation with nitric acid and dehydration of the resulting tetracarboxylic acid as described by Falcigno, et al., J. Poly. Sci. 1992, 30, 1433.

"Alicyclic tetracarboxylic dianhydrides" refer to dianhydrides that are comprised either partially or in whole of saturated carbocyclic rings. The alicyclic tetracarboxylic dianhydrides impart useful solubility properties to polyimides comprising them. Alicyclic tetracarboxylic dianhydrides suitable for the invention are those listed in Table 3. Preferred alicyclic dianhydrides are 5-(2,5-dioxotetrahydro) -3-methyl-3-cyclohexene-1,2-dicarboxylic anhydride (D3), 2,3,5-tricarboxycyclopentaneacetic acid dianhydride (D4), cyclobutanetetracarboxylic acid dianhydride (D5) and 1,2, 3,4-butanetetracarboxylic acid dianhydride (D7).

5-(2,5-Dioxotetrahydro)-3-methyl-3-cyclohexene-1,2-dicarboxylic anhydride (D3) is commercially available from Chriskev Co, Inc. 1,2,3,4-Cyclobutanetetracarboxylic acid is available from Aldrich Chemical Co., Inc. and can be readily converted to the dianhydride with oxalyl chloride. 2,3,5-Tricarboxycyclopentaneacetic acid dianhydride (D4) is available via synthesis by oxidation of dicyclopentadiene with nitric acid as described by Hession, et al., in British Patent 1 518 322 (1976). The synthesis of 1,2,3,4-cyclobutanetetracarboxylic dianhydride (D5) is described by Moore, et al, Chem. Mat., 1989, 1, 163. 1,2,3,4-butanetetracarboxylic acid dianhydride (D7) is available by treatment of the corresponding tetracarboxylic acid (Aldrich) with acetic anhydride. 5,5'-(1,1,3,3-Tetramethyl-1,3-disiloxanediyl)-bis(norbornane-2,3-dicarboxylic anhydride) (D9) is available by hydrosilation of 5-norbornene-2,3-dicarboxylic anhydride with 1,1,3,3-tetramethyldisiloxane as described by Ryang in U.S. Pat. No. 4,381,396. Bicyclo[2.2.1]heptanetetracarboxylic 2,3:5,6-dianhydride (D10) is available by synthesis from bicyclo[2.2.1]hept-5-ene-2,3-dicarboxylic anhydride as described by Matsumoto et al., in Macromolecules 1995, 28, 5684. Bicyclo[2.2.2]oct-7-enetetracarboxylic 2,3:5,6-dianhydride (D11) is available by synthesis from 4-cyclohexene-1,2-dicarboxylic anhydride as described by Itamura, et al., in Macromolecules 1993, 26, 3490.

In preparing polyimides for optical alignment layers the molar ratio of diamine to dianhydride usually is 1:1, but can vary between 0.8:1 to 1:1.2. The preferred ratio of diamine to dianhydride is between 0.98:1 and 1:1.02. Most preferred is a 1:1 ratio of diamine to dianhydride.

Another embodiment of this invention is a novel polyimide composition, derived from a diamine component and a dianhydride component, for generating pre-tilt in alignment of a liquid crystal medium comprising a copolyimide derived from at least one diaryl ketone tetracarboxylic dianhydride, at lest one hydrophobic diamine and at least one alicyclic tetracarboxylic anhydride, which comprises at least two structural elements of the formulas IV and V

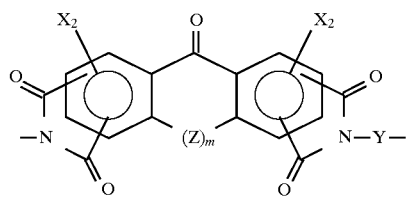

IV

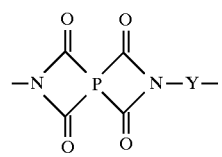

V wherein Y is a divalent radical selected from the formulas II and III

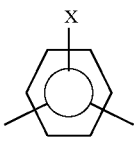

II

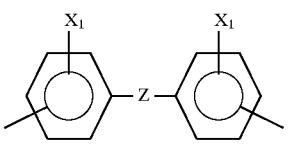

III wherein Z is selected, independently, from the group consisting of —S—, —O—, —SO$_2$—, —CH$_2$—, —C(CF$_3$)$_2$—, —C(O)—, —CH$_2$CH$_2$—, —NR— and a covalent bond wherein R is a C$_1$–C$_4$ hydrocarbon chain; X is independently selected from R$_1$, O—R$_1$, —S—R$_1$, —N(R$_2$)—R$_1$; wherein R$_1$ is independently selected from C$_4$–C$_{20}$ perfluorinated alkyl chain, C$_4$–C$_{20}$ partially fluorinated alkyl chain, and C$_{10}$–C$_{20}$ hydrocarbon chain; X$_1$ is independently selected from X and H; R$_2$ is selected, independently, from H, C$_1$–C$_9$ hydrocarbon chain and and R$_1$, X$_2$ is independently selected from the group consisting of H, CL, F, Br, R$_3$ and R$_3$O—, wherein R$_3$ is independently selected from C$_1$–C$_3$ perflourinated alkyl chain, C$_1$–C$_3$ partially flourinated alkyl chain and C$_1$–C$_8$ hydrocarbon chain; m is 1or 0; and P is a tetravalent organic radical derived from said alicyclic tetracarboxylic dianhydride containing at least four carbon atoms, no more than one carbonyl group of the dianhydride being attached to any one carbon atom of the tetravalent radical. Most preferred is a composition wherein the copolyimide comprises a ratio of structural elements of formula IV and V of 1:10 to 99:1.

Another preferred polyimide composition additionally includes at least one diaminobenzophenone, additionally comprising at least one structural element of formulas VII and VIII

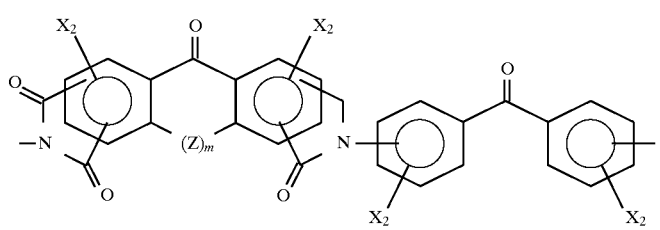

VII

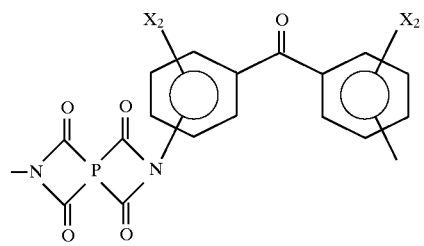

VIII wherein Z, $X_2$, P and m are as described above.

Another embodiment of the invention is a polyimide composition, derived from a diamine component and a dianhydride component, for generating pre-tilt in alignment of a liquid crystal medium comprising a copolyimide derived from at least one diaryl ketone tetracarboxylic dianhydride, at least one hydrophobic diamine and at least one diaminobenzophenone, which comprises at least two structural elements of the formulas IV and VII

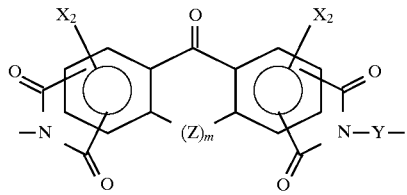
IV

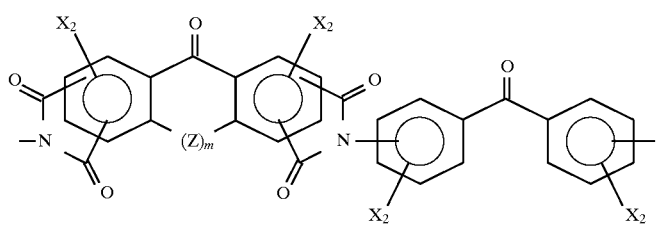
VII wherein Y, Z, X, $X_1$, $X_2$, and m are as previously described.

Another embodiment of the invention is a polyimide composition, derived from a diamine component and a dianhydride component, for generating pre-tilt in alignment of a liquid crystal medium comprising a copolyimide derived from least one alicyclic tetracarboxylic dianhydride, at least one hydrophobic diamine and at least one diaminobenzophenone, which comprises at least two structural elements of the formulas V and VIII

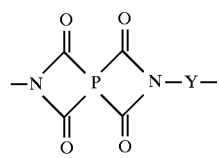
V

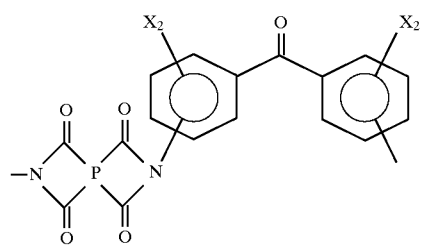
VIII wherein Y, Z, X, $X_1$, $X_2$, P and m are as previously described.

Another embodiment of the invention is polyimide composition, derived from a diamine component and a dianhydride component, for generating pre-tilt in alignment of a liquid crystal medium comprising a copolyimide derived from at least one diaryl ketone tetracarboxylic dianhydride, at least one hydrophobic diamine and at least one diamine derived from a radical $Y_2$, comprising at least one structural element of the formulas IV and IVa

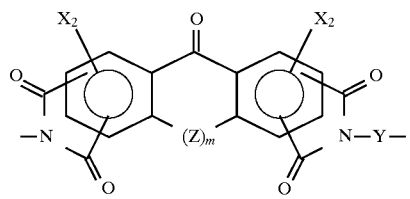
IV

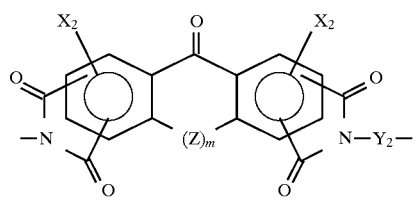
IVa wherein Y, Z, X, $X_1$, $X_2$, P and m are as previously described and $Y_2$ is a divalent radical selected from the formulas IIa and IIIa

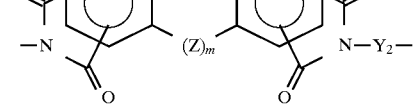
IIa

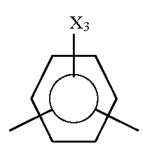
IIIa wherein $X_3$ is independently selected from $C_1$–$C_3$ perfluorinated alkyl chain, partially fluorinated alkyl chain or —$OCF_3$; and $X_4$ is independently selected from $X_3$ and H.

In all the preferred compositions described above there are general preferences for certain functionality. A most preferred diaryl ketone tetracarboxylic anhydride is 3,3',4,4'-benzophenonetetracarboxylic dianhydride. Preferred alicyclic tetracarboxylic acid dianhydrides are 5-(2,5- dioxotetrahydro)-3-methyl-3-cyclohexene-1,2-dicarboxylic anhydride, 2,3,5-tricarboxycyclopentaneacetic acid dianhydride, 1,2,3,4-butanetetracarboxylic acid dianhydride and cyclobutanetetracarboxylic acid dianhydride. Most perferred are 5-(2,5-dioxotetrahydro)-3-methyl-3-cyclohexene-1,2-dicarboxylic anhydride, 2,3,5-tricarboxycyclopentaneacetic acid dianhydride and 1,2,3,4-butanetetracarboxylic acid dianhydride which give useful solubility properties to the polyimides. Most preferred hydrophobic diamines are selected from the group consisting of 4-(1H,1H-pentadecafluoro-1-octyloxy)-1,3-benzenediamine, 4-(1H,1H,11H-eicosafluoro-1-undecyloxy)-1,3-benzenediamine, 4-(1-octadecyloxy)-1,3-benzenediamine, 4-(1-hexadecyl)-1,3-benzenediamine and 2-(1-octadecyloxy)-1,4-benzenediamine. 4,4'-Diaminobenzophenone is a most preferred diaminobenzophenone. Most preferrably radical $Y_2$ is derived from a diamine selected from the group consisting of 2-(trifluoromethyl)-1,4-benzenediamine (1), 5-(trifluoromethyl)-1,3-benzenediamine (2), 2,2'-bis(trifluoromethyl)benzidene (7), 2,2'-bis(trifluoromethoxy)benzidene (6) and 3,3'-bis(trifluoromethyl)benzidene (5).

Preferrably the hydrophobic diamines comprise 1.0 to 50 mol % of the diamine component, and most preferrably the hydrophobic diamines comprise 1.0 to 15 mol % of the diamine component. As will be readily appreciated by those skilled in the art, there is variation in the performance among the many embodiments of the present invention. Most basically, while the required anisotropically absorbing molecules and hydrophobic moieties impart the desired pre-tilt at any concentration, the degree of the effect will be greater with greater concentrations. Similarly, there is a variation in the performance realized between specific anisotropically absorbing molecules and hydrophobic moieties. For example, among the diamines detailed in Table 2, despite a similarity in structure, diamine 10 has been found to yield superior performance to diamine 12, and diamine 8 has been generally found to be particularly satisfactory.

The compositions of the invention provide a combination of high solubility and optical alignment performance (a finite pre-tilt, low energy threshold, high quality alignment & transparency to visible light) that is very desirable for the fabrication of liquid crystal display elements.

To prepare the optical alignment layers of this invention poly(amic acid) solutions or preimidized polyimide solutions polymer solutions are coated onto desired substrates. Coating is usually accomplished with 2 to 30 wt % solids. Any conventional method may be used to coat the substrates including brushing, spraying, spin-csating, dipping or printing. The coated substrates are heated in an oven under an inert atmosphere, for instance nitrogen or argon, at elevated temperature usually not exceeding 300° C. and preferably at or below 180° C. for 1 to 12 hours, preferably for 2 hours or less. The heating process removes the solvent carrier and may be used to further cure the polymer. For instance, the poly(amic) acid films are thermally cured to generate polyimide films.

The optical alignment layers are exposed to polarized light to induce alignment of liquid crystals. By "polarized light" we mean light that is elliptically polarized such that the light is more polarized along one axis (referred to as the major axis) versus the orthogonal axis (referred to as the minor axis). The preferred polarization is linearly polarized light where the light is polarized mostly along one axis (the major axis) with little or no polarization component along the minor axis. In this invention the polarized light has one or more wavelengths of about from 150 to 2000 nm and preferably about from 150 to 1600 nm and more preferably about from 150 nm to 800 nm. Most preferably the polarized light has one or more wavelengths of about from 150 to 400 nm and expecially about from 300 and 400 nm. A preferred source of light is a laser, e.g., an argon, helium neon, or helium cadmium. Other preferred sources of light are mercury arc, xenon lamps, deuterium and quartz tungsten halogen lamps, and black lights in combination with a polarizer. Polarizers useful in generating polarized light from nonpolarized light sources are interference polarizers made from dielectric stacks, absorptive polarizers and reflective polarizers based on Brewster reflection. With lower power lasers or when aligning small alignment regions, it may be necessary to focus the light beam onto the optical alignment layer.

Another source of polarized light is light from a mercury arc, xenon lamp, deuterium and quartz tungsten halogen lamp, or black light that is unpolarized at its source, but incident upon an optical alignment layer at an oblique angle. For unpolarized light incident at an oblique angle onto an interface, the obliqueness of the incident angle causes the unpolarized light to be decoupled into a combination of three linear polarizations (see, for instance, R. W. Wood, Physical Optics, 3rd Ed., p. 397, Optical Scociety of America, Washington D.C., 1988). Similarly, another source of polarized light is circularly polarized light that is incident upon an optical alignment layer at an oblique angle.

Oblique incidence is defined as having the direction of the incident light predominately at an angle other than along a normal to the plane of the substrate. Oblique incidence and incident along the normal is not limited to collimated light. For example, focused light with the cone of light directions symmetric about the normal to the substrate is still considered incident normal to the substrate. However, the same focused light with a cone of light directions symmetric about an axis that makes an angle other than normal to the substrate would be considered oblique incidence.

By "exposing" is meant that polarized light is applied to the entire optical alignment layer or to a portion thereof. The light can be stationary or rotated. Exposures can be in one step, in bursts, in scanning mode or by other methods. Exposure times vary widely with the materials used, etc., and can range from less than 1 msec to over an hour. Exposure may be conducted before or after contacting the optical alignment layer(s) with the liquid crystal medium. Exposing can be accomplished by linearly polarized light transmitted through at least one mask having a pattern or with a beam of linearly polarized light scanned in a pattern. Exposing also may be accomplished using interference of coherent optical beams forming patterns, i.e., alternating dark and bright lines.

Exposure energy requirements vary with the formulation and processing of the optical alignment layer prior and during exposure. For example, materials that possess high glass transition temperatures can have higher energy density requirements for optical alignment. Whereas, material systems designed to have a low glass transition temperature prior to exposure can have lower energy density requirements. A preferred range of exposure energy is about from 0.001 to 2000 J/cm$^2$. More preferred is the range of about from 0.001 to 100 J/cm$^2$ and most preferred range of exposure energy is about from 0.001 to 5 J/cm$^2$. Lower exposure energy is most useful in large scale manufacturing of optical alignment layers and liquid crystal display elements. Lower exposure energy also minimizes the risk of damage to other materials on the substrates.

The efficiency of the alignment process, and the exposure energy required, may be further impacted by heating, beyond that inherent in the "exposing" step. Additional heating during the exposing step may be accomplished by conduction, convection or radiant heating, or by exposure to unpolarized light. Additional heating may increase the mobility of the molecules during exposure and improve the alignment quality of the optical alignment layer. Additional heating is not a requirement of the process of the invention but may give beneficial results.

A preferred method of exposing comprises exposing at least one optical alignment layer to polarized light at an oblique angle of incidence. With this method of exposure, the liquid crystal medium, in the absence of flow effects, exhibits a thermally stable pre-tilt determined by the direction of the oblique angle of incidence of the polarized light as described infra.

Exposing also can consist of two or more exposure steps wherein the conditions of each step such as angle of incidence, polarization state, energy density, and wavelength are changed. At least one of the steps must consist of exposure with linearly polarized light. Exposures can also be localized to regions much smaller than the substrate size to sizes comparable to the entire substrate size.

Another preferred method of exposing comprises exposing at least one optical alignment layer to polarized light at an oblique angle of incidence and exposing the same optical alignment layer to polarized light at a second angle of incidence. In this multi-step process the direction of linear polarization may remain the same or change in each exposure step. In a preferred process, the exposure at an oblique angle of incidence and the exposure at a second angle of incidence are performed with polarized light of different directions of polarization.

All the multiple exposure steps described herein can be performed simultaneously or in series. One example of simultaneous exposure is exposing with unpolarized light at an oblique angle of incidence which is a combination of three linear polarizations. Another example of simultaneous exposure is exposing polarized light at an oblique angle of incidence with a polarization at any direction other than 90° to the plane of incidence. A third example of simultaneous exposing is exposure with two or more polarized light beams with two or more directions of polarization and two or more angles of incidence simultaneously.

A preferred method of dual exposing comprises a two step process of:
(a) exposing at least one optical alignment layer to polarized light at a normal incidence, and
(b) exposing the optical alignment layer to polarized light at an oblique incidence.

Another preferred method of dual exposing comprises a two step process of:
(a) exposing said optical alignment layer to polarized light of a first direction of linear polarization of the incident light beam, and
(b) exposing said optical alignment layer to polarized light of a second direction of linear polarization of the incident light beam.

Another preferred method of dual exposing comprises a two step process of:
(a) exposing said optical alignment layer to polarized light of a first direction of linear polarization of the incident light, and
(b) exposing said optical alignment layer to polarized light of a second direction of linear polarization of the incident light, at an oblique incidence.

As liquid crystal substances used for liquid crystal display elements, nematic liquid crystal substances, ferroelectric liquid crystal substances, etc. are usable. Useful liquid crystals for the invention described herein include those described in U.S. Pat. No. 5,032,009 and new superfluorinated liquid crystals exemplified by ZLI-5079, ZLI-5080, ZLI-5081, ZLI-5092, ZLI-4792, ZLI-1828, MLC-2016, MLC-2019, MLC-6252, and MLC-6043 available from EM Industries, Hawthorne N.Y. Also useful are guest-host formulations prepared with all types of liquid crystals and anisotropically absorbing dyes as described in U.S. Pat. No. 5,032,009. Also useful in this invention are nematic and ferroelectric liquid crystals that are disclosed in U.S. Pat. No. 5,447,759 entitled "Liquid Crystal Alignment Film and Liquid Crystal Display Elements," hereby incorporated by reference.

Chiral dopants are often added to these liquid crystals to induce a twist in one direction, in the liquid crystal medium. Left and right handed chiral dopants are available. Typical examples are ZL1-811, S-1011 and R-1011, all available from EM Industries.

Other liquid crystals useful in this invention include the polymerizable liquid crystals as described in U.S. Pat. No. 5,073,294; and the liquid crystal difunctional methacrylate and acrylate monomers as described in U.S. Pat. No. 4,892,392. Both patents are hereby incorporated by reference.

Still other liquid crystals useful in this invention include liquid crystal polymers as described in U.S. Pat. No. 5,382,548 which is hereby incorporated by reference. These polyester and polyurethane liquid crystal polymers have low rotational viscosities between their glass transition ($T_g$) and their isotropic transition ($T_{ni}$) and readily respond to surface aligning forces.

Preferred liquid crystals for the invention are nematic liquid crystals, ferroelectric liquid crystals, polymerizable nematic liquid crystals and nematic liquid crystalline polymers. Especially preferred liquid crystal for the invention are nematic liquid crystal and polymerizable nematic liquid crystals. Specific families of nematic liquid crystals that are preferred are the 4-cyano-4'-alkylbiphenyls, 4-alkyl-(4'-cyanophenyl)cyclohexanes and the superflourinated liquid crystal mixtures selected from the group of ZLI-5079, ZLI-5080, ZLI-5081, ZLI-5092, ZLI-4792, ZLI-1828, MLC-2016, MLC-2019, MLC-6252, and MLC-6043 available from EM Industries, Hawthorne N.Y.

Applying a liquid crystal medium to the optical alignment layer can be accomplished by capillary filling of a cell, by casting of a liquid crystal medium onto an optical alignment layer, by laminating a preformed liquid crystal film onto an optical alignment layer or by other methods. Preferred methods are capillary filling of a cell and casting of a liquid crystal medium onto an optical alignment layer.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer. Additionally, optical alignment layers can be further processed by conventional alignment techniques such as mechanical buffing, either before or after the exposure step.

After the exposing step and applying the liquid crystal medium, heating the liquid crystal medium and cooling the liquid crystal medium is performed. Herein the combination of steps of heating and cooling is referred to as the heating-cooling cycle.

By "heating" is meant that thermal energy is applied to the liquid crystal medium from any conventional source. Thermal energy sources included are radiant heaters, electric heaters, infrared lamps and convection ovens, and the like. The liquid crystal medium is heated sufficiently to raise the temperature of the medium above the isotropic point. The isotropic point is the liquid crystal-isotropic transition, that is, the discreet temperature at which the medium is transformed from an ordered phase into a randomly isotropic liquid. Heating can be performed in a series of steps or at a constant rate of increase. Preferably, heating is performed to about from 0.01° to 60° C. above the medium's isotropic point especially for a period of about from 1 second to 8 hours. Most preferably, the medium is heated at a temperature of about from 1° to 50° C. above the medium's isotropic point for a period of about from 1 minute to 2 hours.

By "cooling" is meant that thermal energy is removed from the heated liquid crystal medium by any conventional method. Conventional methods include removing the source of thermal energy and allowing the medium to equilibrate to room temperature; quenching the medium by placing it in contact with a cooler medium such as a water bath; or gradually decreasing the amount of thermal energy delivered to the medium. Cooling is performed on the liquid crystal medium to reduce the temperature of the liquid crystal medium below the isotropic point. Cooling can be performed in a series of steps or at a constant rate. Preferably cooling is performed at a constant or variable rate of about from 1000° to 0.01° C./min. Most preferably cooling is performed at a constant or variable rate of about from 100° to 0.1° C./min for a period of about from 1 second to 8 hours.

The process of this invention can be used to make a novel liquid crystal display element, also of this invention. The liquid crystal display element of the present invention is composed of an electrode substrate having at least one optical alignment layer of the present invention, a voltage-impressing means and a liquid crystal material.

FIG. 1 illustrates a typical liquid crystal display element, comprising a transparent electrode 2 of ITO (indium-tin oxide) or tin oxide on a substrate 1 and optical alignment layers 3, of the present invention, formed thereon. The optical alignment layers are exposed to polarized light of a wavelength or wavelengths within the absorption band of the anisotropically absorbing molecules. A spacer concurrently with a sealing resin 4 is intervened between a pair of optical alignment layers 3. A liquid crystal 5 is applied by capillary filling of the cell and the cell is sealed to construct a liquid crystal display element. Substrate 1 may comprise an overcoat film such as an insulating film, a color filter, a color filter overcoat, a laminated polarizing film etc. These coatings and films are all considered part of the substrate 1. Further, active elements such as thin film transitors, a nonlinear resistant element, etc. may also be formed on the substrate 1. These electrodes, undercoats, overcoats, etc. are conventional constituents for liquid crystal display elements and are usable in the display elements of this invention. Using the thus formed electrode substrate, a liquid crystal display cell is prepared, and a liquid crystal substance is filled in the space of the cell, to prepare a liquid crystal display element in combination with a voltage-impressing means.

The exposed anisotropically absorbing molecules induce alignment of a liquid crystal medium at an angle + and −θ with respect to the direction of the polarization of the incident light beam and along the plane of the optical alignment layer. In addition, in the presence of the hydrophobic moieties, the exposed anisotropically absorbing molecules induce a pre-tilt at an angle Φ with respect to the plane of the optical alignment layer.

One skilled in the art will recognize that the process of the instant invention allows control of the alignment of a liquid crystal medium in any desired direction within the plane of the optical alignment layer by controlling the conditions of the polarized light exposure. Preferably the liquid crystal medium is aligned at an angle + and −θ, where θ is equal to 90° with respect to the direction of polarization.

Figure 2:
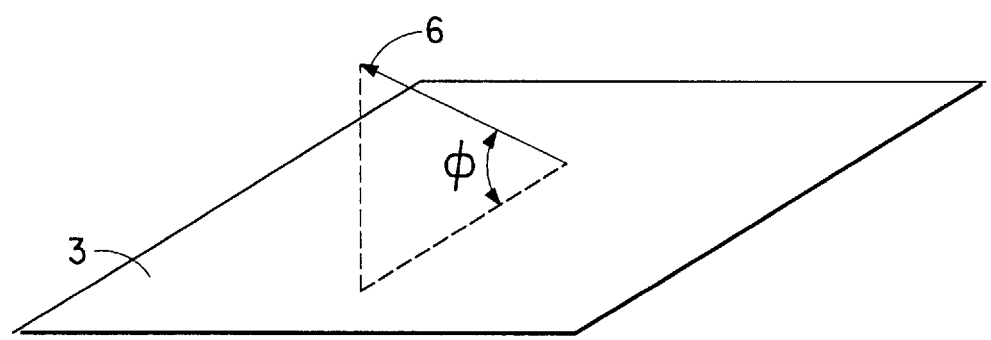
FIG. 2 illustrates pre-tilt angle Φ.

Pre-tilt is an important feature in the operating performance of most liquid crystal displays. FIG. 2 illustrates the pre-tilt angle Φ. The liquid crystal director, 6, is the direction the liquid crystal molecules adjacent the optical alignment layer 3 orient. "Pre-tilt" refers to the angle the liquid crystal director 6 makes relative to the optical alignment layer 3, in a plane defined by the normal to the substrate and the projection of the local liquid crystal director onto the alignment layer. As depicted in FIG. 2, the pretilt angle, Φ, can range from 0° to 180°. Only one substrate is drawn for clarity. For the Φ angles 0° or 180°, the alignment is referred to as homogeneous or planar alignment. For the Φ angle 90°, the alignment is referred to as hometropic or vertical alignment. For the Φ angle ranges greater than 0° and less than or equal to 45° and less than 180° and greater than or equal to 135°, the alignment is referred to as predominately homogeneous or planar alignment. For the Φ angle range greater than 45° but less than 135° exclusive of 90° is referred to as predominately hometropic or vertical alignment.

One skilled in the art will recognize that 0° to 90° pre-tilt is equivalent in magnitude to 180° to 90° pre-tilt, but with opposing directions. Preferred pre-tilts in the process are in the range of 1° to 30° and 179° to 150°. Most preferred pre-tilts are in the range of 2° to 15° and 178° to 165°.

A common way to assess pre-tilt is by direct measurement of the pre-tilt in a planar aligned or twisted nematic cell using the crystal rotation method of Baur, et al., Phys. Lett., (1976) 56A, 142. This method assumes that the pre-tilt throughout the thickness of the liquid crystal layer is a constant. Thus it gives an average value of pre-tilt. Those skilled in the art know that this measurement technique requires construction of anti-parallel planar or non-splay twisted nematic cells to insure a uniform pre-tilt throughout the thickness of the cell. In the examples that follow twisted nematic cells with a non-splay configuration of the alignment layers is used to assess pre-tilt angle.

In some cases flow effects established while applying the liquid crystal medium to the optical alignment layer appear to dominate and determine the pre-tilt direction in the absence of a heating-cooling cycle. However, when a heating-cooling cycle according to the preferred embodiments of the present invention is performed, the flow induced pre-tilt direction and the defects due to flow disappear and what remains is a thermally stable pre-tilt direction. The direction of this thermally stable pre-tilt is determined by that of the oblique angle of incidence of the polarized light in the exposing step. The resulting aligned liquid crystal medium exhibits a degree of uniformity superior to that obtained in the absence of the heating-cooling cycle.

The magnitude of the pretilt also is affected by the heating-cooling cycle of the completed liquid crystal device. The duration of the exposure to heat above the isotropic transition of the liquid crystal in the device lowers the pretilt magnitude which eventually stabilizes at a value below the initial pretilt value. By varying the time at elevated temperatures before cooling the sample, the magnitude of the pretilt can be changed between the initial value and the minimum value. In addition, the type of cooling cycle can also affect the magnitude of the pretilt. If the cooling from the elevated temperature above the isotropic to below the isotropic transition is performed slowly the pretilt magnitude is observed to be smaller than if it is cooled quickly (quenched). As a result, the magnitude of the pretilt can be varied from its initial value to a minimum by decreasing the cooling rate. The magnitude of the pretilt determined by the heating-cooling cycle is stable at room temperature.

This invention is demonstrated in the following examples, which are illustrative and not intended to be limiting. The examples of the invention use several hydrophobic diamines that were prepared by synthesis.

Hydrophobic diamine 10 was made by the following procedure:

A mixture of 2,4-dinitrophenol (85 wt %, 6.72 g, 31 mmol), octadecyl bromide (20.7 g, 62 mmol), sodium carbonate (6.57 g, 62 mmol) and dimethylformamide (31 mL) was heated to 100° C. under a nitrogen atmosphere for 22 h. The cooled mixture was diluted with water (200 mL), acidified with 10N hydrochloric acid (50 mL) and extracted with ether. The extracts were washed with water and brine, and dried over magnesium sulfate. The solvent was removed and the solid recrystallized to give 1-octadecyloxy-2,4-dinitrobenzene (10.7 g, 79%): mp 63.5°–64.0° C.

A mixture of 1-octadecyloxy-2,4-dinitrobenzene (3.99 g 9.15 mmol), tin(II) chloride dihydrate (23.93 g 106 mmol) and absolute ethanol (40 mL) was heated to 70° C. for 5 h. The cooled reaction mixture was poured into ice and basified with concentrated sodium bicarbonate aqueous solution. The mixture was extracted with diethyl ether and the extract dried over magnesium sulfate. The solvent was removed and the product purified by chromatography (silica gel) to give diamine 10 (0.58 g 17%): mp 82.1°–83.0° C.

Hydrophobic diamine 12 was prepared by the following procedure:

A mixture of 1-octadecyloxy-2,5-dinitrobenzene (6.87 g, 15.7 mmol), tin(II) chloride dihydrate (35.5 g, 157.3 mmol) and absolute ethanol (70 mL) was heated to 70° C. for 5 h. The cooled reaction mixture was poured into ice and basified with concentrated potassium hydroxide aqueous solution. The mixture was extracted with diethyl ether and the extract dried over magnesium sulfate. The solvent was removed and the product purified by chromatography (silica gel) to give diamine 12 (5.2 g, 88%): mp 74.0°–74.5° C.

Hydrophobic diamine 16 was prepared by the following procedure:

A mixture of 1-chloro-2,4-dinitrobenzene (Aldrich, 2.02 g, 10 mmol), sodium carbonate (1.27 g, 12 mmol), dioctadecylamine (Pfaltz & Bauer, 6.26 g, 12 mmol) and dry dimethylformamide (10 mL) was heated to 80°–90° C. under a nitrogen atmosphere for 1 h. The cooled mixture was diluted with water and extracted with ether. The extracts were washed with water and dried over magnesium sulfate. The solvent was removed and the solid recrystallized to give N,N-dioctadecyl-2,4-dinitrobenzenamine (6.0 g, 87%): mp 55.5°–57.5° C.

A mixture of N,N-dioctadecyl-2,4-dinitrobenzenamine (11.8 g 17.2 mmol), 5% palladium on carbon (1.8 g, 50% water wet) and tetrahydrofuran (180 g) was hydrogenated at 55 psi and room temperature in a Parr shaker for 7 h. The mixture was filtered through celite and the solvent removed to give a solid. The solid was recrystallized from ethanol to give diamine 16 (7.47 g, 68%): mp 41.5°–44.0° C.

EXAMPLE 1

This example illustrates the process of inducing pre-tilt in alignment of a liquid crystal medium with a novel composition of the invention.

To a solution of 4,4'-diaminobenzophenone (100.8 mg, 0.475 mmol) and 4-(1H,1H-pentadecafluoro-1-octyloxy)-1, 3-benzenediamine, 8, (12.7 mg, 0.025 mmol) in γ-butyrolactone (1.39 g) was added 5-(2,5-dioxotetrahydro) -3-methyl-3-cyclohexene-1,2-dicarboxylic anhydride, D3, (132.1 mg, 0.5 mmol) all at once. The mixture was stirred under a nitrogen atmosphere at room temperature for 16 h. A solution of acetic anhydride (0.142 mL, 1.5 mmol) in γ-butyrolactone (1.0 g) and triethylamine (0.21 mL, 1.5 mmol) were added, consecutively, and the solution heated to 120° C. for 3 h. The solution was cooled and diluted to 3 wt % with γ-butyrolactone (5.44 g) to give a polymer solution ready for spin casting.

Two 0.9 inch by 1.2 inch by 1 millimeter thick borosilicate glass substrates with transparent indium-tin-oxide (ITO) electrode coatings (Donnelly Corp., Holland, Mich.) were spin-coated and cured with the polyimide formulation to give optical alignment layers. Spin coating was achieved by filtering the above solution through an 0.45 μm Teflon filter membrane directly onto the surface of the clean ITO glass substrates. The coated ITO glass substrates were then spun at 2500 RPM for 1 min to produce uniform thin films. The resultant thin films were cured under nitrogen 0.25 h at 80° C. followed by 1 h at 180° C.

Figure 3:
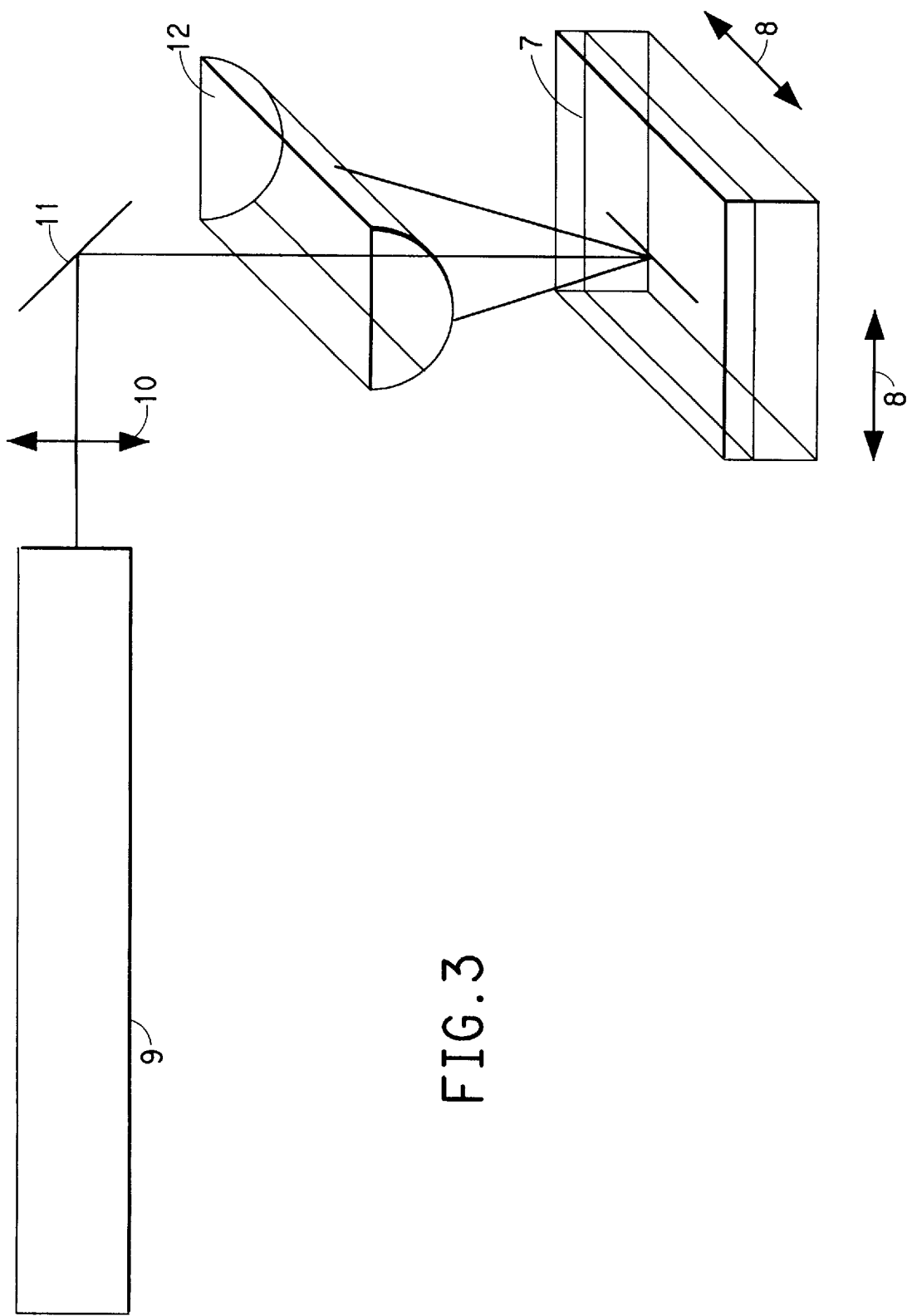
FIG. 3 shows the system used to expose coated substrates to ultraviolet light.

The coated substrates were exposed to ultrviolet polarized light using the set-up schematically represented in FIG. 3. In this experiment each coated substrate 7 was mounted onto a 2-axis XY translation stage (indicated by double-headed arrows 8 in FIG. 3) with the coated sides facing the incident laser beam. An Innova 400 (Coherent Incorporated, Santa Clara, Calif.) laser 9 was tuned to lase in the ultraviolet with wavelengths ranging from 308 to 336 nm. A mirror 11 directs the light to a 5 cm focal length cylindrical lens 12 which focused the incident 1 cm beam to a line (1 cm×200 μm) onto each coated substrate 7. The coated substrate was translated at a 3.0 mm/s constant speed along the Y direction and then stepped in the X direction. This was repeated until the coated substrate had been completely exposed. The incident optical power was 0.25 Watts and the ultraviolet light was polarized along 10.

A twisted nematic liquid crystal cell was constructed from the two exposed coated substrates. Six micron glass fiber spacers (EM Industries, Inc., Hawthorne, N.Y.) were mixed in with an epoxy and the epoxy mixture was placed at the edges of the coated side on one exposed substrate. The second exposed substrate was placed on top of the first substrate such that the alignment layers were facing each other and the respective background alignment directions were perpendicular to each other. The substrates were pressed to a six micrometer spacing using clamps and the fiber spacer/epoxy mixture was cured for 5 mins. Two spaces on opposite sides of the cell were left unsealed so that the liquid crystal will fill the cell along the bisector between the alignment directions of the substrates. The cell was placed in a vacuum and, subsequently, one unsealed opening on the cell was dipped into ZLI4792 nematic liquid crystal (EM Industries, Inc., Hawthorne, N.Y.) doped with 0.1% ZLI811 (EM Industries, Inc., Hawthorne, N.Y.) chiral compound. After filling, the cell was removed from the liquid crystal and vacuum, cleaned up, and the spaces sealed with epoxy.

The cell was viewed between parallel and crossed polarizers on a photographic light box. For the two polarizer configurations, the transmission of the cell was consistent with a twisted nematic orientation of the liquid crystal and the majority of the cell gave a net uniform twisted nematic alignment. The pretilt angle was measured, using the crystal rotation method, to be approximately 8 degrees.

EXAMPLE 2

To a solution of 4,4'-diaminobenzophenone (95.5 mg, 0.45 mmol) and diamine 8 (25.3 mg, 0.05 mmol) in γ-butyrolactone (1.43 g) was added dianhydride D3 (132.1 mg, 0.5 mmol) all at once. The mixture was stirred under a nitrogen atmosphere at room temperature for 16 h. A solution of acetic anhydride (0.142 mL, 1.5 mmol) in γ-butyrolactone (1.0 g) and triethylamine (0.21 mL, 1.5 mmol) were added, consecutively, and the solution heated to 120° C. for 3 h. The solution was cooled and diluted to 3 wt % with γ-butyrolactone (5.44 g) to give a polymer solution.

The polymer solution was spin coated, cured and optically processed as described in Example 1 with a scan speed of 0.5 mm/s. The results were the same as Example 1 except that the pretilt was measured to be approximately 18 degrees.

EXAMPLE 3

To a solution of 2-(trifluoromethyl)-1,4-benzenediamine, 1, (44.0 mg, 0.25 mmol), 3,3'-bis(trifluoromethyl)benzidene, 5, (40.0 mg, 0.125 mmol) and diamine 8 (63.3 mg, 0.125 mmol) in γ-butyrolactone (2.0 g) was added 3,3',4,4'-benzophenonetetracarboxylic dianhydride, D1, (161.1 mg, 0.5 mmol) all at once. The mixture was stirred under a nitrogen atmosphere at room temperature for 16 h. A solution of acetic anhydride (0.142 mL, 1.5 mmol) in γ-butyrolactone (1.0 g) and triethylamine (0.21 mL, 1.5 mmol) were added, consequetively, and the solution heated to 120° C. for 3 h. The solution was cooled and diluted to 3 wt % with -butyrolactone (6.67 g) to give a solution ready for spin casting.

The polymer solution was spin coated, cured and optically processed as described in Example 1 except the coated substrates were glass without ITO (Donnelly Corp., Holland, Mich.). The results were the same as Example 1 except that scan speed was 0.5 mm/s and the pretilt was measured to be approximately 31 degrees.

EXAMPLE 4

To a solution of 4,4'-diaminobenzophenone (95.5 mg, 0.45 mmol) and diamine 8 (25.3 mg, 0.05 mmol) in γ-butyrolactone (1.75 g) was added dianhydride D1 (161.1 mg, 0.5 mmol) all at once. The mixture was stirred under a nitrogen atmosphere at room temperature for 16 h. The solution was diluted to 3 wt % with γ-butyrolactone (7.37 g) to give a polymer solution ready for spin casting.

The polymer solution was spin coated, cured and optically processed as described in Example 1 except the liquid crystal used was MLC6043-000 (EM Industries, Inc., Hawthorne, N.Y.) with 0.1% ZLI811, and the scan speed was 1.5 mm/s. The results were the same as Example 1 except that the pretilt was measured to be approximately 10 degrees.

EXAMPLE 5

To a solution of 4,4'-diaminobenzophenone (95.5 mg, 0.45 mmol) and diamine 8 (25.3 mg, 0.05 mmol) in γ-butyrolactone (1.25 g) was added 1,2,3,4-butanetetracarboxylic dianhydride, D7, (99.0 mg, 0.5 mmol) all at once. The mixture was stirred under a nitrogen atmosphere at room temperature for 16 h. A solution of acetic anhydride (0.142 mL, 1.5 mmol) in γ-butyrolactone (1.0 g) and triethylamine (0.21 mL, 1.5 mmol) were added, consequetively, and the solution heated to 120° C. for 3 h. The solution was cooled and diluted to 3 wt % with γ-butyrolactone (4.55 g) to give a polymer solution ready for spin casting.

The polymer solution was spin coated, cured and optically processed as described in Example 1 except the scan speed was 0.5 mm/s. The results were the same as Example 1 except that the pretilt was measured to be approximately 20 degrees.

EXAMPLE 6

To a solution of 4,4'-diaminobenzophenone (100.8 mg, 0.475 mmol) and diamine 8 (12.7 mg, 0.025 mmol) in γ-butyrolactone (1.20 g) was added dianhydride D7 (99.0 mg, 0.5 mmol) all at once. The mixture was stirred under a nitrogen atmosphere at room temperature for 16 h. A solution of acetic anhydride (0.142 mL, 1.5 mmol) in γ-butyrolactone (1.0 g) and triethylamine (0.21 mL, 1.5 mmol) were added, consequetively, and the solution heated to 120° C. for 3 h. The solution was cooled and diluted to 4 wt % with γ-butyrolactone (2.59 g) to give a polymer solution ready for spin casting.

The polymer solution was spin coated, cured and optically processed as described in Example 1 except the scan speed was 1.5 mm/s. The results were the same as Example 1 except that the pretilt was measured to be approximately 22 degrees.

EXAMPLE 7

To a solution of diamine 1, (83.6 mg, 0.475 mmol) and diamine 8 (12.7 mg, 0.025 mmol) in γ-butyrolactone (1.46 g) was added dianhydride D1 (161.1 mg, 0.5 mmol) all at once. The mixture was stirred under a nitrogen atmosphere at room temperature for 16 h. The solution was diluted to 4 wt % with γ-butyrolactone (4.72 g) to give a polymer solution ready for spin casting.

The polymer solution was spin coated, cured and optically processed as described in Example 1 except the scan speed was 5 mm/s. The results were the same as Example 1 except that the pretilt was measured to be approximately 8 degrees.

EXAMPLE 8

To a solution of 5-(trifluoromethyl)-1,3-benzenediamine, 2, (66.0 mg, 0.375 mmol), and diamine 8 (63.3 mg, 0.125 mmol) in γ-butyrolactone (1.46 g) was added dianhydride D1 (120.8 mg, 0.375 mmol) and dianhydride D3 (33.0 mg, 0.125 mmol) all at once. The mixture was stirred under a nitrogen atmosphere at room temperature for 16 h. The solution was diluted to 4 wt % with γ-butyrolactone (5.19 g) to give a polymer solution ready for spin casting.

The polymer solution was spin coated, cured and optically processed as described in Example 1 except the scan speed was 0.25 mm/s. The results were the same as Example 1 except that the pretilt was measured to be approximately 10 degrees.

EXAMPLE 9

To a solution of 4,4'-diaminobenzophenone (79.6 mg, 0.375 mmol) and diamine 10, (47.0 mg, 0.125 mmol) in γ-butyrolactone (1.92 g) was added dianhydride D1 (161.1 mg, 0.5 mmol) all at once. The mixture was stirred under a nitrogen atmosphere at room temperature for 16 h. A solution of acetic anhydride (0.142 mL, 1.5 mmol) in γ-butyrolactone (1.0 g) and triethylamine (0.21 mL, 1.5 mmol) were added, consecutively, and the solution heated to 120° C. for 3 h. The solution was cooled and diluted to 4 wt % with γ-butyrolactone (4.98 g) to give a polymer solution ready for spin casting.

The polymer solution was spin coated, cured and optically processed as described in Example 1 except the scan speed was 1.5 mm/s. A pretilt>1 degree was observed by the crystal rotation method.

EXAMPLE 10

To a solution of 4-(1H,1H,11H-eicosafluoro-1-undecyloxy)-1,3-benzenediamine, 9, (39.9 mg, 0.0625 mmol) and 4,4'-diaminostilbene (13.1 mg, 0.0625 mmol) in N-methylpyrolidone (NMP) (0.89 g) was added dianhydride D1 (40.25 mg, 0.125 mmol) dissolved in NMP (0.89 g). The mixture was stirred for 17 h at room temperature under a nitrogen atmosphere. The mixture was diluted with 1 wt % solids with anhydrous tetrahydrofuran (THF) (7.15 g) to give a polymer solution ready for spin casting.

The polymer solution was spin coated, cured and optically processed as described in Example 1 except the coated substrates were glass without ITO and the scan speed was 1.5 mm/s. The results were the same as Example 1 except that the pretilt was measured to be approximately 23 degrees.

EXAMPLE 11

To a solution of 1,3,4-(N,N-dioctadecyl)benzenetriamine, 16, (39.2 mg, 0.0625 mmol) and 4,4'-diaminostilbene (13.1 mg, 0.0625 mmol) in NMP (0.88 g) was added a solution of dianhydride D1 (40.2 mg, 0.125 mmol) in NMP (0.88 g).The mixture was stirred for 18 h at room temperature under a nitrogen atmosphere. The mixture was diluted with 1 wt % solids with anhydrous tetrahydrofuran (THF) (6.65 g) to give a polymer solution ready for spin casting.

The polymer solution was spin coated, cured and optically processed as described in Example 1 except the coated substrates were glass without ITO and the scan speed was 1.5 mm/s. The results were the same as Example 1 except that the pretilt was measured to be approximately 28 degrees.

EXAMPLE 12

3-Trifluoromethyl-4-(3'-trifluoromethyl-4'-aminophenyl) azobenzenamine, C, was first prepared using the following procedures:

2-Trifluoromethyl-4-nitro-benzeneamine (4.92 g, 23.8 mmol) slurried in 5N hydrochloric acid (15.8 mL) and ice (16 g) was diazotized with 2M sodium nitrite (12.6 mL, 25 mmol) at 0°–5° C., followed by coupling with 3-trifluoromethylbenzeneamine (5.0 g, 31 mmol) in 5N hydrochloric acid (8 mL) at 0°–5° C. The mixture was stirred occasionally for 0.5 h, basified with 25 wt % aqueous potassium carbonate. The resulting solid was recrystallized from THF-ethanol (1:1) to give 4-(3'-trifluoromethyl-4'-nitrophenyl)azobenzeneamine: 1.8 g; mp 144.0°–145.5° C.

The above monoazo nitroamine (1.65 g, 4.36 mmol) in ethanol (20 mL) was treated with a solution of sodium sulfide nonahydrate (2.1 g, 8.7 mmol) in water (2 mL). The mixture was heated to 80° C. for 0.5 h, followed by addition of a similar amount of sodium sulfide nonahydrate solution. The mixture was heated for 1 h and diluted with water (200 mL). The resulting solid was dissolved in hot ethanol and filtered and the ethanol removed to give 3-trifluoromethyl-4-(3'-trifluoromethyl-4'-aminophenyl)azobenzenamine: mp 135.5°–136.5° C.

To a solution of diamine 8 (31.6 mg, 0.0625 mmol) and 3-trifluoromethyl-4-(3'-trifluoromethyl-4'-aminophenyl) azobenzenamine, C, (21.7 mg, 0.0625 mmol) in NMP (0.89 g) was added a solution of dianhydride D1 (40.2 mg, 0.125 mmol) in NMP (0.89 g). The mixture was stirred under a nitrogen atmosphere for 18 h at room temperature. The mixture was diluted with 1 wt % solids with anhydrous tetrahydrofuran (THF) (7.49 g) to give a polymer solution ready for spin casting.

The polymer solution was spin coated, cured and optically processed as described in Example 1 except the coated substrates were glass without ITO and the scan speed was 1.5 mm/s. The results were the same as Example 1 except that the pretilt was measured to be approximately 40 degrees.

EXAMPLE 13

This example demonstrates that the polyimide of Example 1 can optically induce the alignment of liquid crystals when exposed to polarized ultraviolet lamp light.

Figure 4:
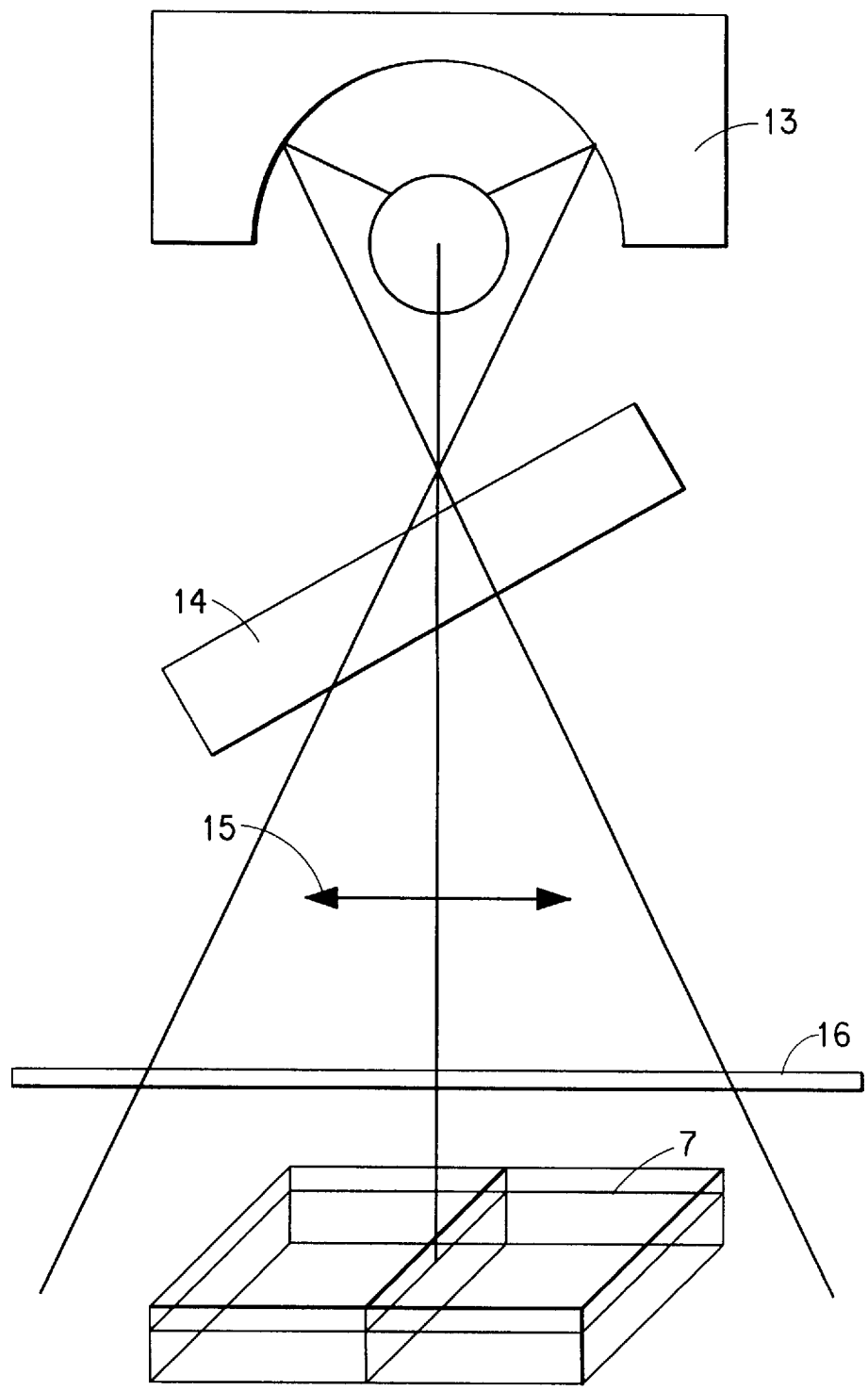
FIG. 4 is a schematic illustration of the system used to expose coated substrates with ultraviolet light from a UV lamp source.

Two coated substrates 7 coated with the polyimide of Example 1 were exposed by an ultraviolet lamp as depicted in FIG. 4. The ultraviolet lamp 13 (UV Process Supply, Chicago, Ill., Model Porta-Cure 1500F) was 16 cm from the substrates 7 with the coated side facing the lamp. A 3×4 inch dielectric polarizer 14 (CVI Laser Corporation, Albuquerque, N.Mex.) was placed in front of the light beam. The polarizer 14 gave approximately 20:1 of p-polarized light 15 to s-polarized light in transmission for wavelengths between 300–400 nm. The light was subsequently passed through a 1 mm thick soda lime glass plate 16 (Donnelly Mirrors, Inc., Holland, Mich.). The glass plate 16 has a cut-off of approximately 300 nm (transmission is less than 10% for any wavelength less than 300 nm). To prevent illumination of the coated substrates 7 from unpolarized stray light, aluminum foil (not shown in figure) was placed to block all light that did not pass through the polarizer 14. The output of the lamp 13 was set at 200 Watts/inch and allowed to warm-up for 10 minutes prior to placing the coated substrates 7 in front of the light beam.

The power density of the light beam at the substrates 7 was measured to be 14 milliwatts/cm$^2$ using a Control Cure compact radiometer from UV Process Supply, Chicago, Ill. The substrates were exposed for 10 minutes and a cell was assembled and filled as in Example 1.

The results were the same as in Example 1. A pretilt>1 degree was observed by the crystal rotation method.

EXAMPLE 14

To a solution of diamine 1 (79.2 mg, 0.45 mmol) and diamine 8 (25.3 mg, 0.05 mmol) in γ-butyrolactone (1.84 g) was added dianhydride D1 (161.1 mg, 0.5 mmol) all at once. The mixture was stirred under a nitrogen atmosphere at room temperature for 16 h. The solution was diluted to 4 wt % with γ-butyrolactone (4.53 g), filtered through a 0.45 μm teflon filter and spin coated onto soda-lime glass substrates (0.9"×1.2") at 2500 rpms. The coated substrates were dried at 80° C. for 0.25 h and 180° C. for 1 h in a nitrogen atmosphere and stored in a nitrogen atmosphere at room temperature until used.

The polymer solution was spin coated, cured and optically processed as described in Example 1 except the scan speed was 0.5 mm/s. The results were the same as Example 1 except that the pretilt was measured to be approximately 17 degrees.

EXAMPLE 15

To a solution of 4,4'-diaminobenzophenone (79.6 mg, 0.375 mmol) and diamine 12, (47.0 mg, 0.125 mmol) in γ-butyrolactone (1.63 g) was added dianhydride D1 (161.1 mg, 0.5 mmol) all at once. The mixture was stirred under a nitrogen atmosphere at room temperature for 16 h. The solution was diluted to 4 wt % with γ-butyrolactone (5.27 g) to give a polymer solution ready for spin casting.

The polymer solution was spin coated, cured and optically processed as described in Example 1 except the scan speed was 1.5 mm/s. The results were the same as Example 1 except that the pretilt was measured to be >1.0 degree.

If the liquid crystal displays prepared according to each of the above Examples, after optically inducing pre-tilt, are visually examined under 100× magnification between crossed polarizers, these liquid crystal displays will exhibit substantially no irregularities in the pattern of alignment resulting from scratches, while liquid crystal display elements treated by mechanical buffing will exhibit substantial irregularities.

EXAMPLE 16

This example demonstrates that the polyimide of Example 1 can optically induce the alignment and pre-tilt of liquid crystals when exposed to polarized light at oblique incidence.

As in Example 1, two coated substrates were exposed except that the scan speed was 1.5 mm/s. The same substrates were subsequently exposed to 300–336 nm, p-polarized light (light polarized in the plane of incidence) at an oblique angle of approximately 70 degrees from the normal to the substrates in a plane of incidence defined by the normal to the substrates and the incident light direction. The scan direction was in the plane of incidence and the same direction as for the initial normal incidence exposure at 1.5 mm/s. The scan speed for this oblique exposure was chosen to be 9 mm/s and the cylindrical lens used to focus the p-polarized light onto the substrates had a 10 cm focal length.

A cell was assembled and filled as in Example 1. The cell was viewed between parallel and crossed polarizers on a photographic light box. For the two polarizer configurations, the transmission of the cell was consistent with a twisted nematic orientation of the liquid crystal and the majority of the cell gave a net uniform twisted nematic alignment. However, defects due to flow of the liquid crystal into the cell were observable. The pre-tilt angle was measured using the crystal rotation method to be approximately 29 degrees.

EXAMPLE 17

This example demonstrates that heating above the isotropic transition and subsequently cooling below the isotropic transition of optically aligned liquid crystals stabilizes the magnitude of the pre-tilt as determined by the exposure conditions and removes defects caused during filling of the cell.

The cell of Example 16 was heated to 120° C. for 30 minutes in a Mettler FP52 hot stage (Mettler Corporation, Hightstown, N.J.) and cooled to below the isotropic temperature (110° C. for ZLI4792) by removing the cell and holding the cell at the corners with two fingers in air and observing that the cell between crossed polarizers has completely entered the nematic phase.

The results were the same as Example 16 except that the defects due to the flow had disappeared. At the edge of the cell disclination lines were observable but very few were observable in the central region of the cell. The pre-tilt angle was measured to be approximately 5 degrees and stable at room temperature.

EXAMPLE 18

This example demonstrates that the heating and cooling cycle of Example 17 stabilizes the magnitude and direction of the pre-tilt as determined by the exposure conditions and removes defects caused during the filling of the cell.

Example 16 was repeated except that the cell was filled perpendicular to the fill direction used in Example 16 where the fill direction was along the bisector between the scan directions on the substrates. It was found via the crystal rotation method that the pre-tilt was directed approximately + and −45 degrees (dictated by the 90 degree twist in alignment directions between the substrates) to the new filling direction and, thus, perpendicular to the cells of Examples 1 and 16. This direction led to a splay configuration of the cell for ZLI4792 doped with ZLI811.

After the cell was subjected to the heating and cooling cycle of Example 17, it was observed via the crystal rotation method that the pre-tilt was directed approximately + and −45 degrees to the bisector of the pre-tilt (scan) direction on each substrate as determined by the exposure conditions. The pretilt had a magnitude of approximately 1.5 degrees and was stable at room temperature. Therefore, after heating and cooling, the pre-tilt direction was observed to flip 90 degrees relative to the cell prior to the thermal cycling. This new direction led to a nonsplay configuration of the cell for ZLI4792 doped with ZLI811 which is consistent with the pre-tilt direction of Example 1. As in Example 17, the defects due to the flow had disappeared and disclinations had formed near the edge of the cell.

EXAMPLE 19

This example demonstrates that the pre-tilt can be controlled by varying the heating and cooling cycle of the optically aligned cell.

Four cells were exposed, assembled and filled as in Example 16. One cell was heated and cooled as in Example 17 resulting in a pre-tilt of approximately 4 degrees and the defects due to the flow had disappeared and disclinations had formed near the edge of the cell.

A second cell was heated and cooled in a VWR (Bridgeport, N.J.) 1410 oven at 120° C. for 30 minutes and cooled by quenching (the cell was placed immediately onto the countertop which was at room temperature) and the resulting pre-tilt was approximately 10 degrees. The defects due to the flow had disappeared and slightly more disclinations had formed near the edge of the cell when compared to the heating and cooling cycle of Example 17.

A third cell was heated and cooled in the VWR 1410 oven at 120° C. for 30 minutes and allowed to slowly cool to 50° C. over approximately 2.5 hours. The pre-tilt was approximately 2.5 degrees and the defects due to the flow had disappeared and very few disclinations had formed near the edge of the cell.

The fourth cell was heated and cooled in the VWR 1410 oven at 120° C. for 90 minutes and cooled as described in Example 17. The pre-tilt was approximately 5 degrees and the defects due to the flow had disappeared and more disclinations had formed near the edge of the cell when compared to the heating and cooling cycle of Example 17.

TABLE 1

Dye Designation / Structure

A: $H_2N-C_6H_4-N=N-C_6H_3(CH_3)-N=N-C_6H_2(CH_3)(OCH_3)-NH_2$

B: $H_2N-C_6H_4-CH=CH-C_6H_4-NH_2$

C: $NH_2-C_6H_3(CF_3)-N=N-C_6H_3(CF_3)-NH_2$

TABLE 2

Diamines used in Polyimide Alignment Layers

| No. | Structure |
|---|---|
| 1 | $H_2N-C_6H_3(CF_3)-NH_2$ (2,4-diamino with CF$_3$) |
| 2 | 3,5-diamino-benzotrifluoride; $H_2N-C_6H_3(CF_3)-NH_2$ |
| 3 | $H_2N-C_6H_3(CF_3)-NH_2$ (isomer) |
| 4 | $H_2N-C_6H_3(OCF_3)-NH_2$ |
| 5 | 2,2'-bis(trifluoromethyl)-4,4'-diaminobiphenyl |
| 6 | 3,3'-bis(trifluoromethoxy)-4,4'-diaminobiphenyl |
| 7 | 3,3'-bis(trifluoromethyl)-4,4'-diaminobiphenyl |
| 8 | $H_2N-C_6H_3(OCH_2(CF_2)_7F)-NH_2$ |
| 9 | $H_2N-C_6H_3(OCH_2(CF_2)_{10}H)-NH_2$ |
| 10 | $H_2N-C_6H_3(OC_{18}H_{37})-NH_2$ |
| 11 | $H_2N-C_6H_3(OC_8H_{17})-NH_2$ |
| 12 | $H_2N-C_6H_3(OC_{18}H_{37})-NH_2$ |
| 13 | $H_2N-C_6H_3(OC_8H_{17})-NH_2$ |

TABLE 2-continued

Diamines used in Polyimide Alignment Layers

| No. | Structure |
|---|---|
| 14 | (C8H17, NH2, H2N on benzene) |
| 15 | (HN-C18H37, NH2, H2N on benzene) |
| 16 | (N(C18H37)2, NH2, H2N on benzene) |

TABLE 3

Alicyclic tetracarboxylic dianhydrides

| No. | Structure |
|---|---|
| D3 | (methylcyclohexene dianhydride structure) |
| D4 | (cyclopentane dianhydride structure) |
| D5 | (cyclobutane tetracarboxylic dianhydride) |
| D6 | (cyclopentane tetracarboxylic dianhydride) |
| D7 | (butane tetracarboxylic dianhydride) |
| D8 | (cyclohexane tetracarboxylic dianhydride) |
| D9 | (bis-norbornyl disiloxane dianhydride with Me-Si-O-Si-Me) |
| D10 | (norbornane dianhydride structure) |
| D11 | (bicyclic tetracarboxylic dianhydride) |

We claim:

1. A process for inducing pre-tilt in alignment of a liquid crystal medium adjacent to a surface of an optical alignment layer comprising;

(a) exposing at least one optical alignment layer, comprising anisotropically absorbing molecules and hydrophobic moieties, to polarized light, the polarized light having a wavelength within the absorption band of said anisotropically absorbing molecules; wherein the exposed anisotropically absorbing molecules induce alignment of the liquid crystal medium at an angle + and $-\theta$ with respect to the direction of the polarization of the incident light beam and along the surface of the optical alignment layer, and induce a pre-tilt at an angle $\Phi$ with respect to the surface of the optical alignment layer;

(b) applying the liquid crystal medium to the optical alignment layer, the medium having an isotropic point; and thereafter (c) heating the liquid crystal medium above its isotropic point; and (d) cooling the liquid crystal medium below its isotropic point.

2. A process of claim 1 wherein the exposing comprises at least two exposures to polarized light.

3. A process of claim 1 comprising exposing at least one optical alignment layer to polarized light at an oblique angle of incidence.

4. A process of claim 3 further comprising exposing the optical alignment layer to polarized light at a second angle of incidence.

5. A process of claim 4 wherein the polarized light used in the exposure at an oblique angle of incidence and a second angle of incidence has different directions of polarization.

6. A process of claim 1 wherein the liquid crystal medium is heated at a temperature about from 0.01° to 60° C. above the isotropic point of the liquid crystal medium.

7. A process of claim 6 comprising heating the liquid crystal medium for about from 1 second to 8 hours.

8. A process of claim 6 comprising cooling tile liquid crystal medium at a rate of about from 1000° to 0.01° C./min.

9. A process of claim 8 comprising cooling the liquid crystal medium for a period of about from 1 second to 8 hours.

10. A process of claim 1 wherein the anisotropically absorbing molecules and hydrophobic moieties are covalently bonded to a polymer.

11. A process of claim 1 wherein the anisotropically absorbing molecules are nonbonded solutes dissolved in a hydrophobic polymer.

12. A process of claim 10 wherein the polymer comprises a polyimide polymer.

13. A process of claim 12 wherein the polyimide polymer is a reaction product of at least one tetracarboxylic dianhydride and at least one hydrophobic diamine, which comprises at least one structural element of the formula I

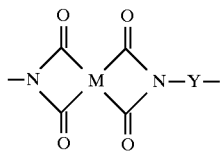

wherein Y is a divalent radical selected from the formulas II and III

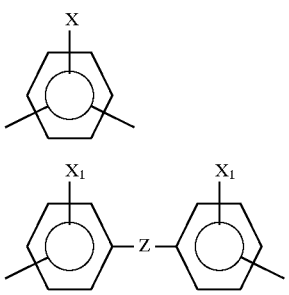

wherein Z is selected from tile group consisting of —S—, —O—, —SO$_2$—, —CH$_2$—, —C(CF$_3$)$_2$—, —C(O)—, —CH$_2$CH$_2$—, —NR— and a covalent bond wherein R is a $C_1$–$C_4$ hydrocarbon chain; X is independently selected from $R_1$, —O—$R_1$, —S—$R_1$, —N($R_2$)—$R_1$; wherein $R_1$ is independently selected from $C_4$–$C_{20}$ perfluorinated alkyl chain, $C_4$–$C_{20}$ partially fluorinated alkyl chain, and $C_{10}$–$C_{20}$ hydrocarbon chain; $X_1$ is independently selected from X and H; $R_2$ is independently selected from H, $C_1$–$C_9$ hydrocarbon chain and $R_1$; and wherein M is a tetravalent organic radical derived from said tetracarboxylic dianhydride containing at least two carbon atoms, no more than two carbonyl groups of the dianhydride being attached to any one carbon atom of the tetravalent radical.

14. A process of claim 13 wherein the polyimide polymer is a copolyimide which additionally comprises at least one structural element of formula Ia

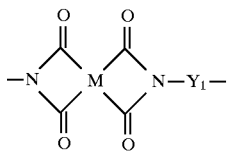

wherein $Y_1$ is a divalent organic radical having at least two carbon atoms other than Y; M is as defined in claim 13, and wherein the ratio of structural elements of formula I and Ia are 1:99 to 99:1.

15. A process of claim 13 wherein the tetracarboxylic dianhydride is a diaryl ketone tetracarboxylic dianhydride and said structural element of the formula I is formula IV

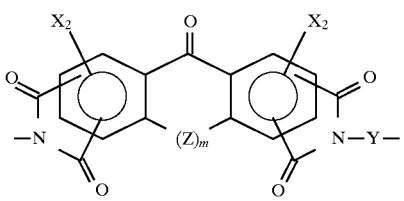

wherein $X_2$ is independently selected from the group consisting of H, CL, F, Br, $R_3$ and $R_3$O—, wherein $R_3$ is independently selected from $C_1$–$C_3$ perflourinated alkyl chain, $C_1$–$C_3$ partially flourinated alkyl chain and $C_1$–$C_8$ hydrocarbon chain; m is 1 or 0; and Z and Y are as defined in claim 13.

16. A process of claim 13 wherein at least one tetracarboxylic dianhydride is an alicyclic tetracarboxylic dianhydride.

17. A process of claim 15 wherein the polyimide polymer is a copolymer, and additionally includes an alicyclic tetracarboxylic dianhydride, which further comprises the structural element of formula V

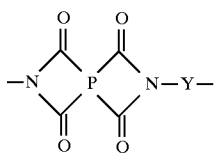

wherein P is a tetravalent organic radical derived from said alicyclic tetracarboxylic dianhydride containing at least four carbon atoms, no more than one carbonyl group of the dianhydride being attached to any one carbon atom of the tetravalent radical; Y is as defined in claim 13.

18. A process of claim 17 wherein the copolymer comprises a ratio of structural elements of formulas IV and V of 1:10 to 99:1.

19. A process of claim 17 wherein the alicyclic tetracarboxylic dianhydride is selected from 5-(2,5-dioxotetrahydro)-3-methyl-3-cyclohexene-1,2-dicarboxylic anhydride, 2,3,5-tricarboxycyclopentaneacetic acid dianhydride, 1,2,3,4-butanetetracarboxylic acid dianhydride and cyclobutanetetracarboxylic acid dianhydride.

20. A process of claim 15 wherein the diaryl ketone tetracarboxylic anhydride is 3,3',4,4'-benzophenonetetracarboxylic dianhydride.

21. A process of claim 13 wherein the polyimide polymer is a copolyimide which additionally comprises at least one structural element of formula VI

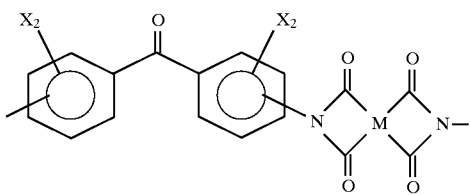

VI wherein $X_2$ is independently selected from the group consisting of H, CL, F, Br, $R_3$ and $R_3O$—, wherein $R_3$ is independently selected from $C_1$–$C_3$ perflourinated alkyl chain, $C_1$–$C_3$ partially flourinated alkyl chain and $C_1$–$C_8$ hydrocarbon chain; and M is as described in claim 13.

22. A process of claim 13 wherein the hydrophobic diamine is selected from the group consisting of 4-(1H,1H-pentadecafluoro-1-octyloxy)-1,3-benzenediamine, 4-(1H,1H,11H-eicosafluoro-1-undecyloxy)-1,3-benzenediamine, 4-(1-octadecyloxy)-1,3-benzenediamine, 4-(1-hexadecyl)-1,3-benzenediamine and 2-(1-octadecyloxy)-1,4-benzenediamine.

23. A process of claim 1 wherein the anisotropically absorbing molecules are selected from the group arylazo, poly(arylazo), stilbene and diaryl ketone derivatives.

24. A process of claim 1 wherein the anisotropically absorbing molecules are selected from the group arylazo, stilbene and diaryl ketone derivatives having absorbance maxima between 150 and 400 nm.

25. A process of claim 1 wherein the anisotropically absorbing molecules are selected from the group consisting of 4,4'-diaminostilbene, the 2,4-diaminophenylhydrazones of benzophenone, 4,4'-diaminobenzophenone, and 3,3'-bis(trifluoromethyl)benzophenone and diazodiamine A.

26. A process of claim 1 wherein the anisotropically absorbing molecules are selected from the group consisting of benzophenone, 4,4'-bis(trifluoromethyl)benzophenone, 3,4'-bis(trifluoromethyl)benzophenone, 3,3'-bis(trifluoromethyl)benzophenone; and phenylhydrazones of benzophenone, 4,4'-bis(trifluoromethyl)benzophenone, 3,4'-bis(trifluoromethyl)benzophenone; and 3,3'-bis(trifluoromethyl)benzophenone.

27. A process of claim 1 wherein the polarized light is from a laser.

28. A process of claim 1 wherein the polarized light is from a source selected from the group: mercury arc, xenon deuterium, and quartz tungsten halogen lamp, and black lights; in combination with a polarizer.

29. A process of claim 1 wherein the polarized light is unpolarized at its source and that is incident upon the optical alignment layer at an oblique angle of incidence.

30. A process of claim 1 wherein the exposing is performed in a scanning mode.

31. A process of claim 1 wherein the exposing comprises delivery of 0.001 to 2000 J/cm², within the absorption band of the anisotropically absorbing molecules, to said optical alignment layer.

32. A process of claim 1 wherein the exposing is a two step process of:

exposing at least one optical alignment layer to polarized light at a normal incidence, and exposing said optical alignment layer to polarized light at an oblique incidence.

33. A process of claim 1 wherein said exposing is a two step process of:

exposing said optical alignment layer to polarized light of a first direction of linear polarization of the incident light, and exposing said optical alignment layer to polarized light of a second direction of linear polarization of the incident light.

34. A process of claim 1 wherein the exposing is a two step process of:

exposing said optical alignment layer to polarized light of a first direction of linear polarization of the incident light, and exposing said optical alignment layer to polarized light of second direction of linear polarization of the incident light, at an oblique incidence.

35. A process of claim 1 wherein the polarized light has one or more wavelengths of about from 150 to 800 nm.

36. A process of claim 1 wherein the polarized light has one or more wavelengths of about from 150 to 400 nm.

37. A process of claim 1 wherein the polarized light has one or more wavelengths of about from 300 to 400 nm.

38. A process of claim 1 wherein the applying a liquid crystal medium comprises capillary filling a cell.

39. A process of claim 1 wherein the applying a liquid crystal to medium comprises casting of said liquid crystal medium onto an optical alignment layer.

40. A process of claim 1 wherein the liquid crystal medium is selected from the group consisting of nematic liquid crystals, ferroelectric liquid crystals, polymerizable nematic liquid crystals and nematic liquid crystalline polymers.

41. A process of claim 1 wherein the liquid crystal medium is selected from the group consisting of nematic liquid crystals and polymerizable nematic liquid crystals.

42. A process of claim 41 wherein the nematic liquid crystals are selected from the group consisting of 4-cyano-4'-alkylbiphenyls, 4-alkyl-(4'-cyanophenyl)cyclohexanes and superflourinated liquid crystal mixtures.

43. A process of claim 1 wherein the alignment of the liquid crystal medium is at an angle + and −θ, wherein θ is equal to 90°.

44. A process of claim 1 wherein the pre-tilt at an angle Φ is about from 1° to 30°.

45. A process of claim 1 wherein the pre-tilt at an angle Φ is about from 2° to 15°.

46. A liquid crystal display element derived from the process of claim 1.

47. A process of claim 2 wherein the exposures are simultaneous.

48. A process of claim 2 wherein the exposures are sequential.

* * * * *